US010566907B1

(12) United States Patent
Hayasaki

(10) Patent No.: US 10,566,907 B1
(45) Date of Patent: Feb. 18, 2020

(54) POWER SUPPLY APPARATUS AND IMAGE FORMING APPARATUS

(71) Applicant: CANON KABUSHIKI KAISHA, Tokyo (JP)

(72) Inventor: Minoru Hayasaki, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/546,636

(22) Filed: Aug. 21, 2019

(30) Foreign Application Priority Data

Aug. 28, 2018 (JP) ................. 2018-159759

(51) Int. Cl.
*H02M 3/335* (2006.01)
*G03G 15/00* (2006.01)
*H02M 1/088* (2006.01)
*H02M 1/00* (2006.01)

(52) U.S. Cl.
CPC ........ *H02M 3/33569* (2013.01); *G03G 15/80* (2013.01); *H02M 1/088* (2013.01); *H02M 2001/0032* (2013.01)

(58) Field of Classification Search
CPC ................. H02M 2001/0032; G03G 15/80
See application file for complete search history.

(56) References Cited

U.S. PATENT DOCUMENTS

| | | | |
|---|---|---|---|
| 6,018,467 A * | 1/2000 | Majid | H02M 3/33523 363/16 |
| 8,242,873 B2 | 8/2012 | Hayasaki | |
| 8,503,197 B2 | 8/2013 | Hayasaki | |
| 9,048,739 B2 | 6/2015 | Shoji | |
| 9,304,478 B2 | 4/2016 | Hayasaki | |
| 9,329,561 B2 | 5/2016 | Hayasaki | |
| 9,599,950 B2 | 3/2017 | Hayasaki | |
| 9,621,061 B2 | 4/2017 | Hayasaki | |
| 10,389,260 B2 * | 8/2019 | Op Het Veld | H02M 3/33569 |
| 10,432,084 B2 * | 10/2019 | Saito | H02M 1/38 |
| 2001/0017780 A1 * | 8/2001 | Hosotani | H02M 3/33561 363/16 |

(Continued)

FOREIGN PATENT DOCUMENTS

JP 2013-143877 7/2013

OTHER PUBLICATIONS

U.S. Appl. No. 16/588,105 filed Sep. 30, 2019, by Minoru Hayasaki.

*Primary Examiner* — Yusef A Ahmed
(74) *Attorney, Agent, or Firm* — Venable LLP

(57) ABSTRACT

The power supply apparatus having a current resonance circuit includes a charge unit connected to a primary winding of a transformer, and storing electric charge, and a connection unit connected in series with the charge unit, and configured to switch the charge unit between a connecting state in which one of charging and discharging is enabled, and a non-connecting state, and after making the connection unit into the connecting state, while a current is flowing into either one of the first diode and the second diode, the first control unit performs transition from a halt period to an operating period of a switching operation by turning ON the switching element of the one of the first diode and the second diode, the current being flowing into the one of the first diode and the second diode.

8 Claims, 13 Drawing Sheets

(56) References Cited

U.S. PATENT DOCUMENTS

| | | | | |
|---|---|---|---|---|
| 2004/0257837 A1* | 12/2004 | Xu | H02M 3/33592 | 363/21.04 |
| 2005/0047175 A1* | 3/2005 | Kawasaki | H02M 3/33569 | 363/16 |
| 2005/0226008 A1* | 10/2005 | Harada | H02M 1/15 | 363/15 |
| 2006/0176715 A1* | 8/2006 | Hosotani | H02M 3/33569 | 363/21.01 |
| 2006/0187685 A1* | 8/2006 | Uematsu | H02M 3/335 | 363/16 |
| 2008/0291702 A1* | 11/2008 | Hosotani | H02M 3/33569 | 363/21.02 |
| 2010/0149840 A1* | 6/2010 | Hayasaki | H02M 3/3381 | 363/21.09 |
| 2010/0172159 A1* | 7/2010 | Kyono | H02M 3/33507 | 363/21.17 |
| 2011/0075464 A1* | 3/2011 | Sato | H02M 3/33592 | 363/127 |
| 2011/0216557 A1* | 9/2011 | Fujiyoshi | H02M 1/34 | 363/21.09 |
| 2012/0081927 A1* | 4/2012 | Matsumoto | H02M 3/33523 | 363/21.05 |
| 2012/0140530 A1* | 6/2012 | Nemoto | H02M 3/3385 | 363/21.12 |
| 2012/0313433 A1* | 12/2012 | Uno | H02M 3/33561 | 307/31 |
| 2014/0376271 A1* | 12/2014 | Chiba | H02M 3/335 | 363/21.01 |
| 2015/0124487 A1* | 5/2015 | Fu | H02M 3/33569 | 363/17 |
| 2015/0249394 A1* | 9/2015 | Liu | H02M 3/285 | 363/21.02 |
| 2017/0005585 A1* | 1/2017 | Shimura | H02M 3/33569 | |
| 2018/0146109 A1* | 5/2018 | Kobayashi | H02M 1/44 | |
| 2018/0316269 A1* | 11/2018 | Shimura | G03G 15/80 | |
| 2019/0058387 A1* | 2/2019 | Shimura | H02M 1/08 | |
| 2019/0058406 A1* | 2/2019 | Asano | H02M 3/33569 | |
| 2019/0260295 A1* | 8/2019 | Shimura | B41J 2/435 | |

\* cited by examiner

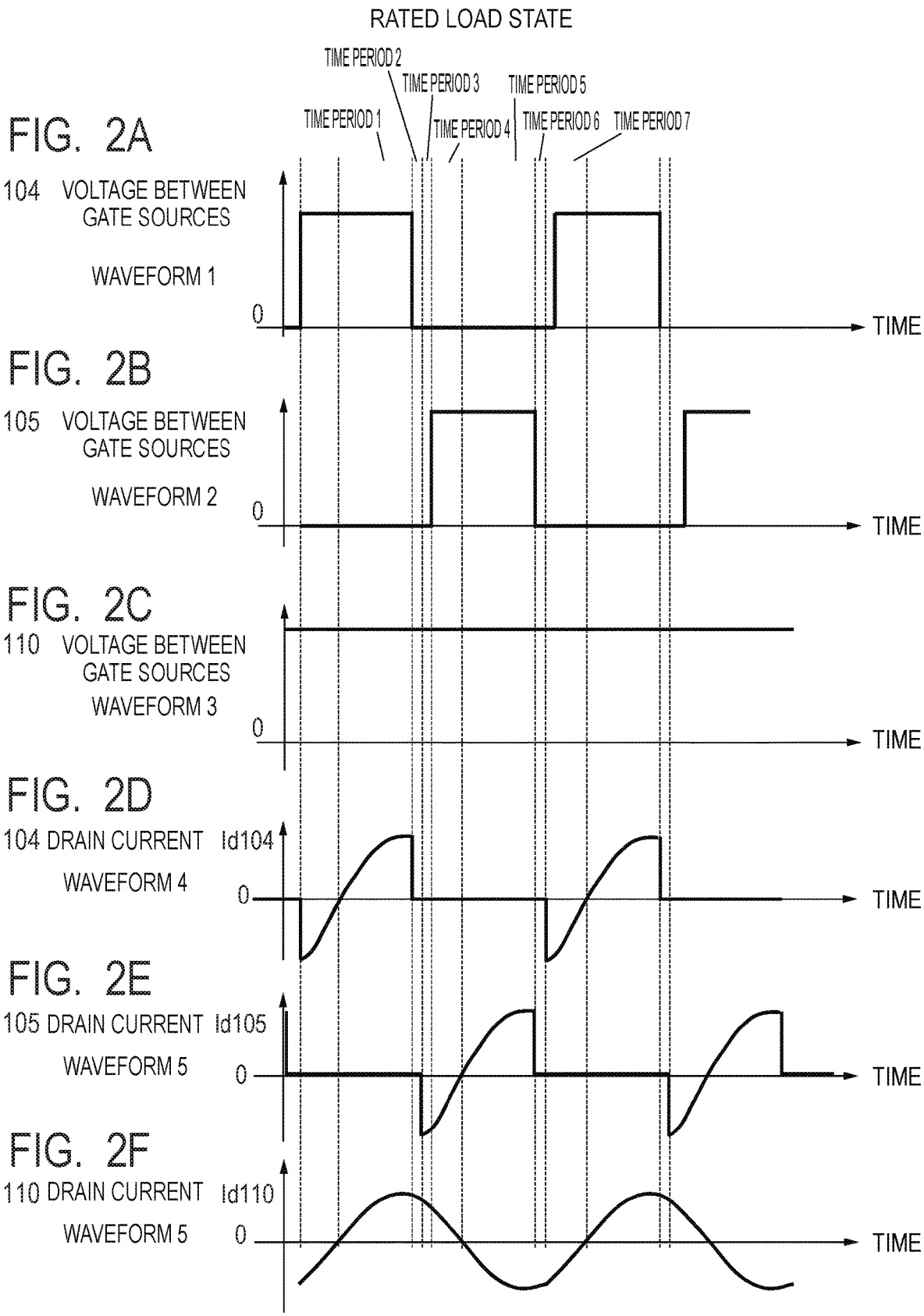

104 VOLTAGE BETWEEN GATE SOURCES
WAVEFORM 1

105 VOLTAGE BETWEEN GATE SOURCES
WAVEFORM 2

110 VOLTAGE BETWEEN GATE SOURCES
WAVEFORM 3

104 DRAIN CURRENT Id104
WAVEFORM 4

105 DRAIN CURRENT Id105
WAVEFORM 5

110 DRAIN CURRENT Id110
WAVEFORM 6

105 DRAIN VOLTAGE

TERMINAL 4 VOLTAGE

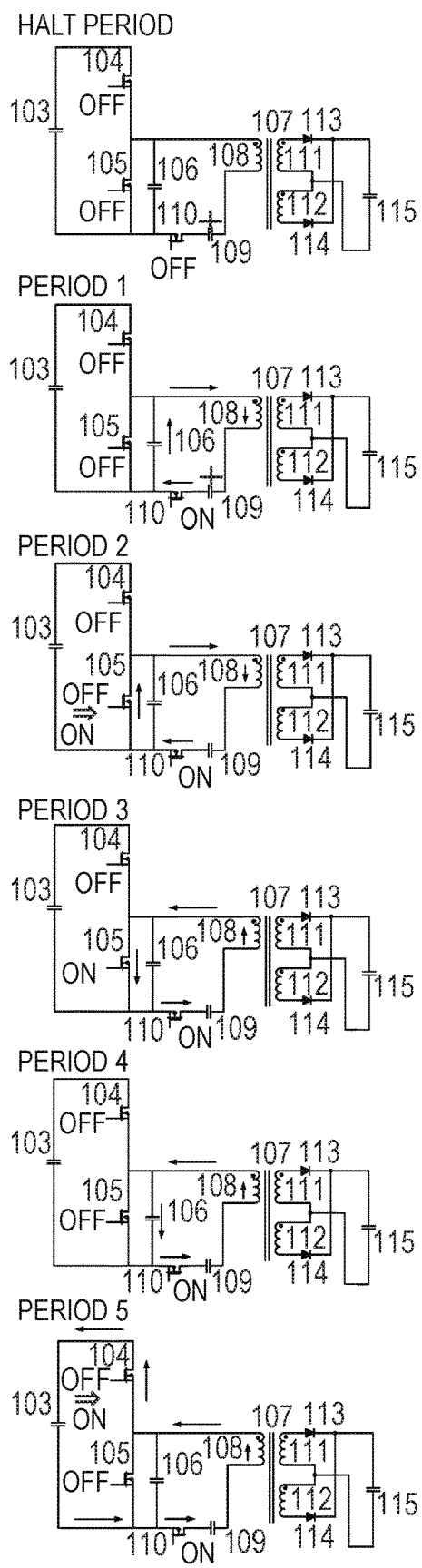
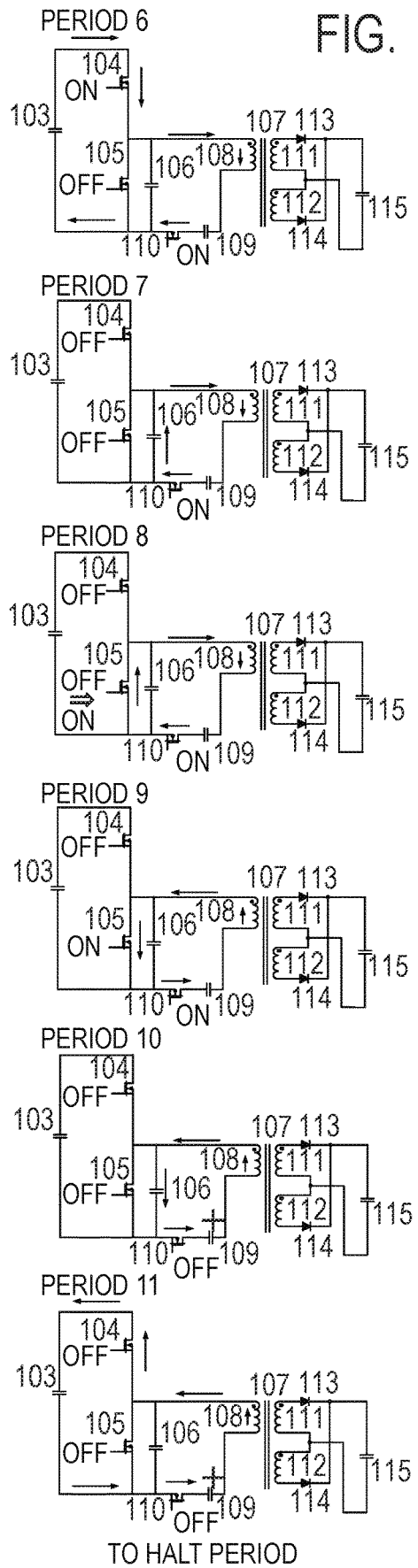
FIG. 4

104 VOLTAGE BETWEEN GATE SOURCES
WAVEFORM 1

105 VOLTAGE BETWEEN GATE SOURCES
WAVEFORM 2

401 VOLTAGE BETWEEN GATE SOURCES
WAVEFORM 3

104 DRAIN CURRENT Id104
WAVEFORM 4

105 DRAIN CURRENT Id105
WAVEFORM 5

401 DRAIN CURRENT Id401
WAVEFORM 6

105 DRAIN VOLTAGE
WAVEFORM 7

TERMINAL 4 VOLTAGE V1
WAVEFORM 8

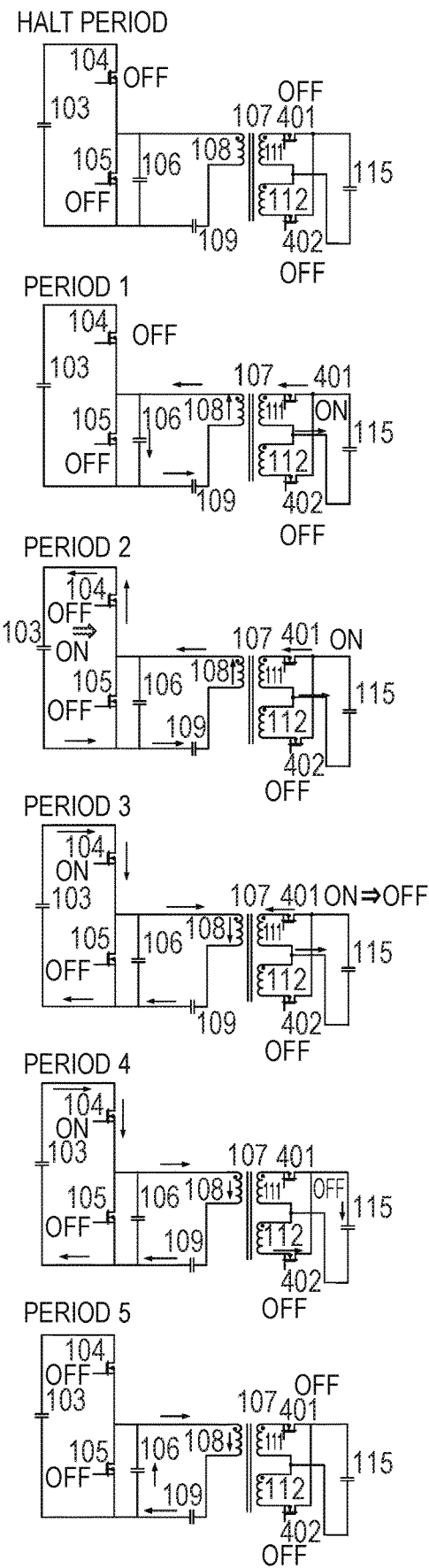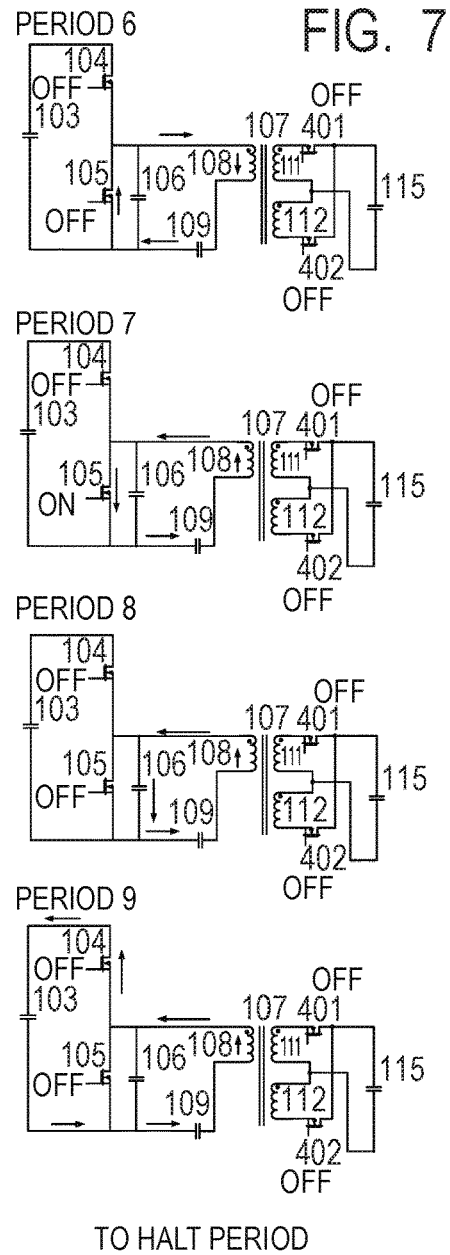
FIG. 7

FIG. 8A
104 VOLTAGE BETWEEN GATE SOURCES
WAVEFORM 1
FIG. 8B
105 VOLTAGE BETWEEN GATE SOURCES
WAVEFORM 2
FIG. 8C
401 VOLTAGE BETWEEN GATE SOURCES
WAVEFORM 3
FIG. 8D
104 DRAIN CURRENT Id104
WAVEFORM 4
FIG. 8E
105 DRAIN CURRENT Id105
WAVEFORM 5
FIG. 8F
401 DRAIN CURRENT Id401
WAVEFORM 6
FIG. 8G
105 DRAIN VOLTAGE
WAVEFORM 7
FIG. 8H
TERMINAL 4 VOLTAGE V1
WAVEFORM 8
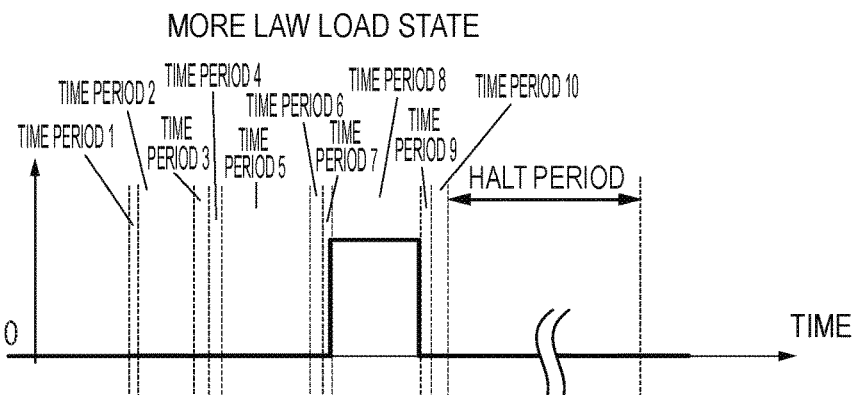
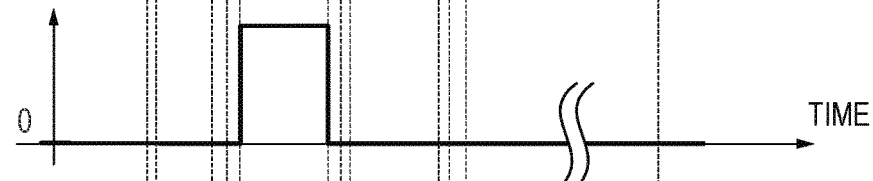
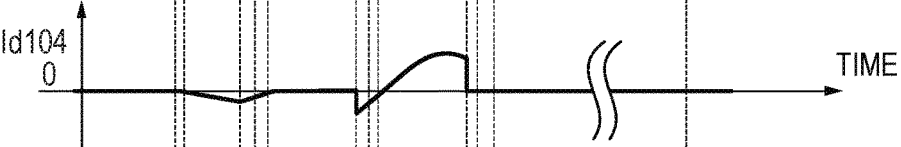
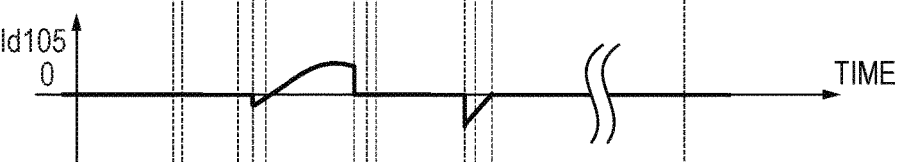
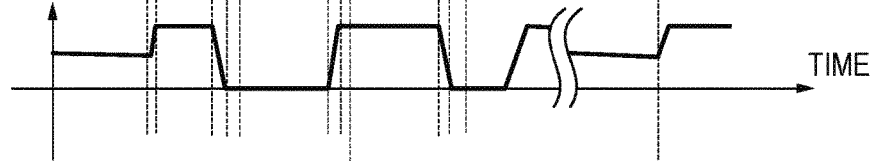
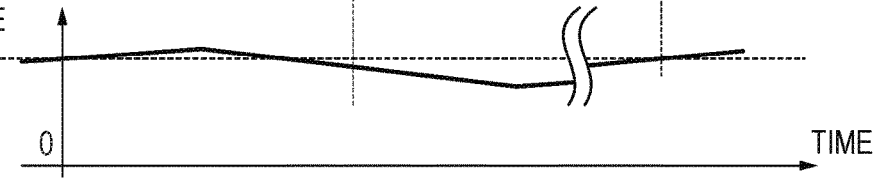

FIG. 9
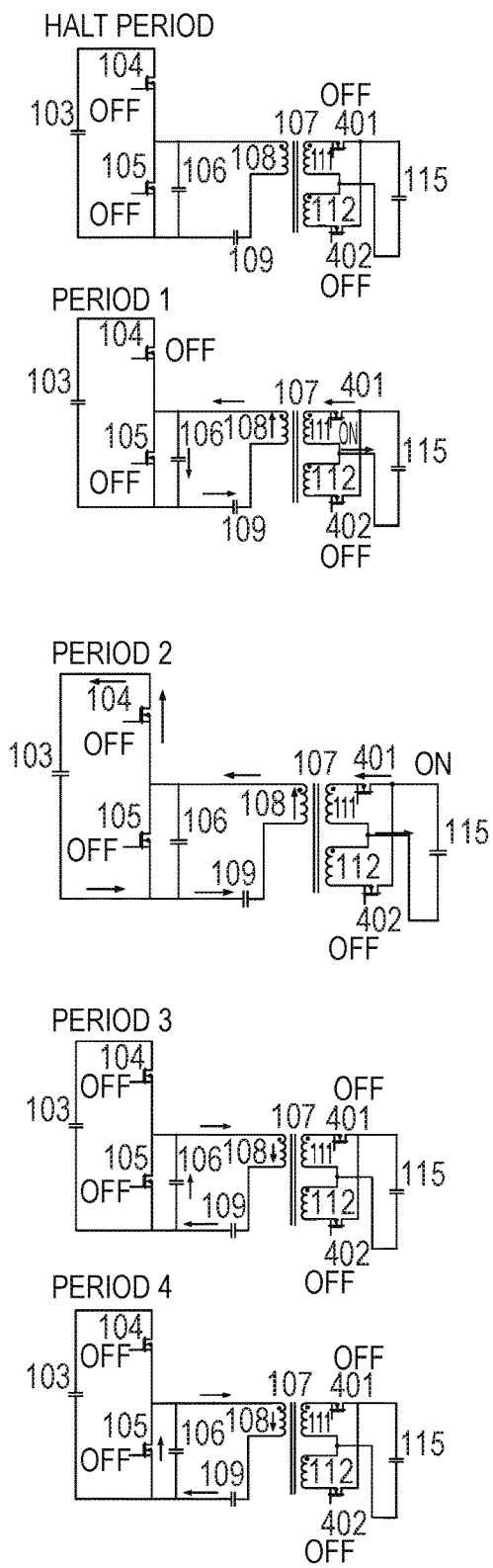
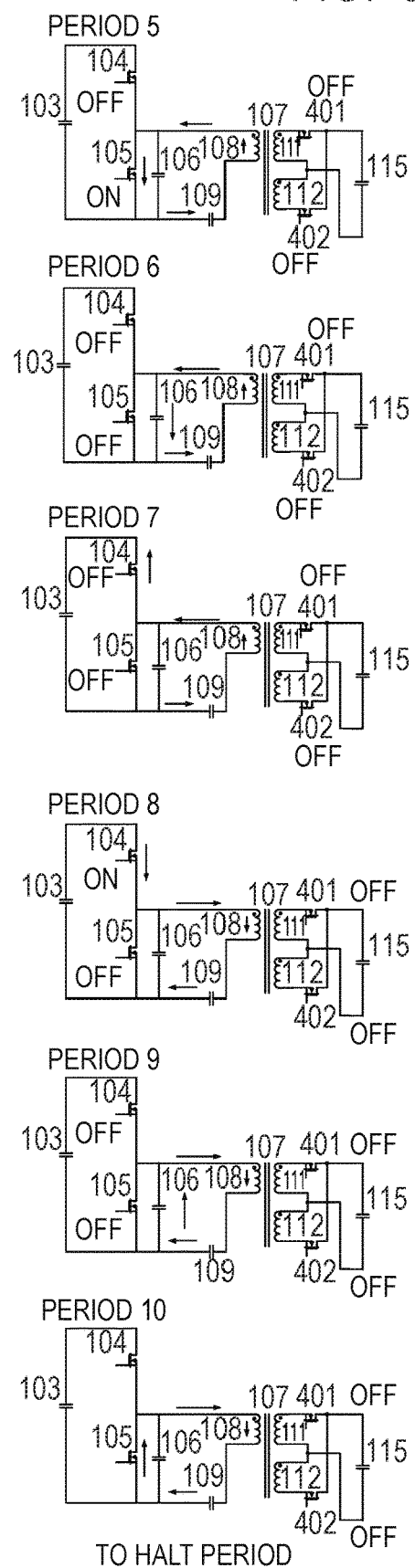

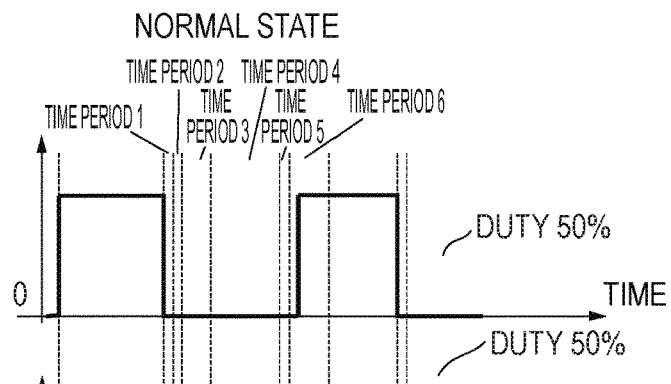
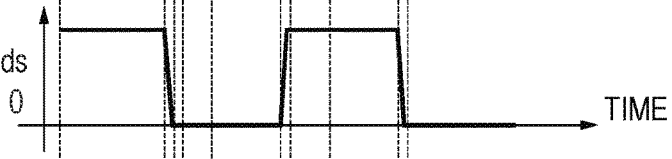
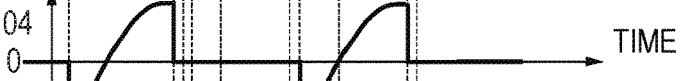
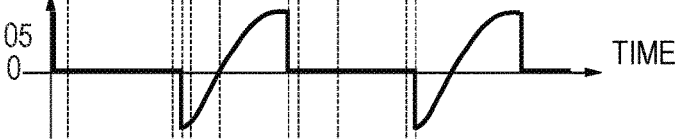
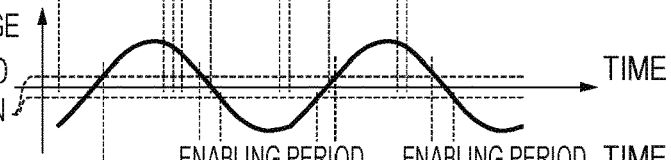
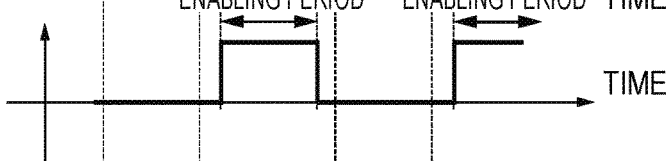
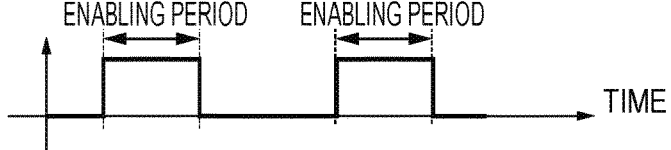

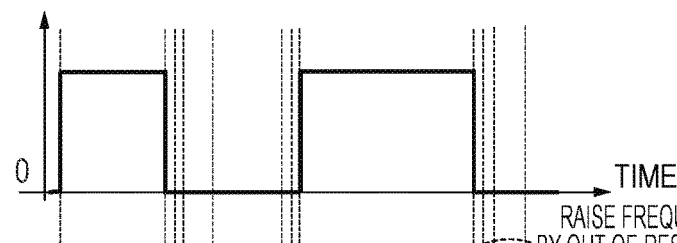

FIG. 11A 104 VOLTAGE BETWEEN GATE SOURCES WAVEFORM 1

FIG. 11B 105 VOLTAGE BETWEEN GATE SOURCES WAVEFORM 2

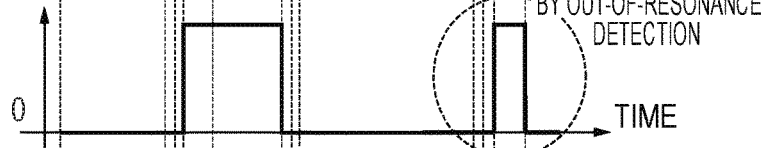

FIG. 11C 105 VOLTAGE BETWEEN DRAIN AND SOURCE WAVEFORM 3

FIG. 11D 104 DRAIN CURRENT Id104 WAVEFORM 4

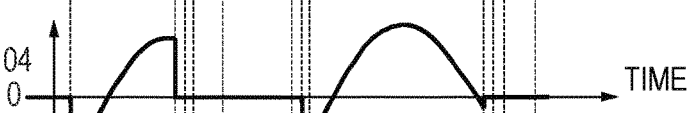

FIG. 11E 105 DRAIN CURRENT Id105 WAVEFORM 5

FIG. 11F RESISTOR 128 VOLTAGE WAVEFORM 6 ENABLING STATE DETECTION THRESHOLD VALUE

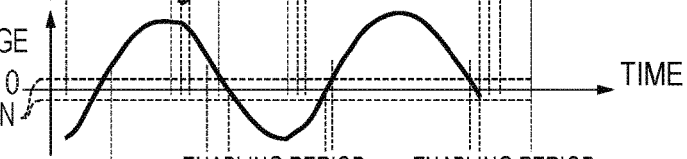

FIG. 11G 105 ENABLING STATE DETECTION

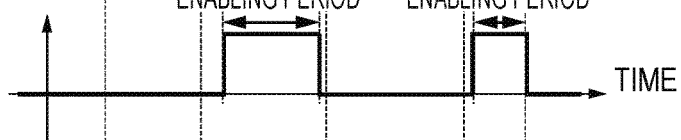

FIG. 11H 104 ENABLING STATE DETECTION

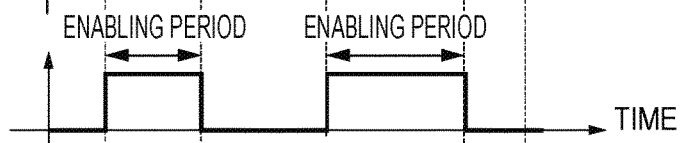

FIG. 11I OUT-OF-RESONANCE DETECTION

OUT-OF-RESONANCE OCCURRENCE STATE
(EMBODIMENT 4)

FIG. 12A
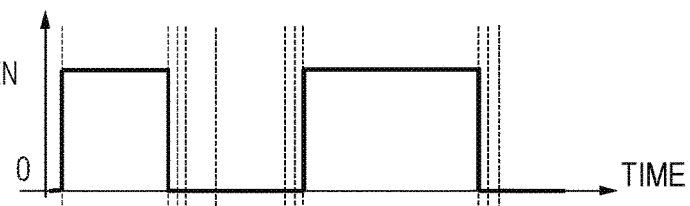
104 VOLTAGE BETWEEN GATE SOURCES WAVEFORM 1

FIG. 12B
105 VOLTAGE BETWEEN GATE SOURCES WAVEFORM 2
MOVE TO HALT PERIOD FIG. 12C
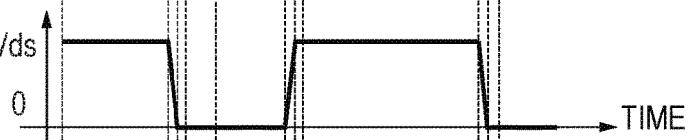
105 VOLTAGE BETWEEN Vds DRAIN AND SOURCE WAVEFORM 3

FIG. 12D
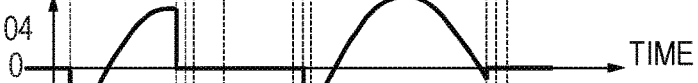
104 DRAIN CURRENT Id104 WAVEFORM 4

FIG. 12E
105 DRAIN CURRENT Id105 WAVEFORM 5
NO OUT-OF-RESONANCE

FIG. 12F
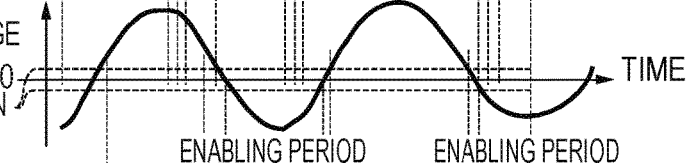
RESISTOR 128 VOLTAGE WAVEFORM 6
ENABLING STATE DETECTION THRESHOLD VALUE FIG. 12G
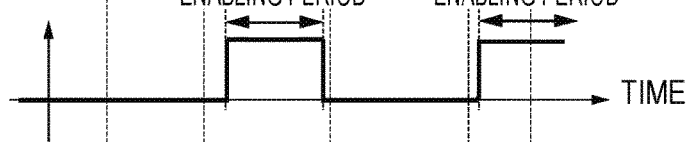
105 ENABLING STATE DETECTION
ENABLING PERIOD   ENABLING PERIOD FIG. 12H
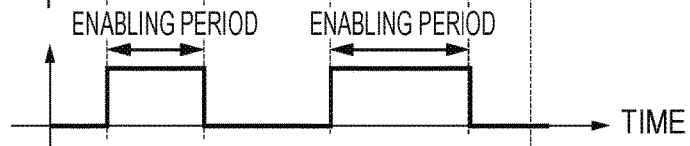
104 ENABLING STATE DETECTION
ENABLING PERIOD   ENABLING PERIOD FIG. 12I
OUT-OF-RESONANCE DETECTION

POWER SUPPLY APPARATUS AND IMAGE FORMING APPARATUS

BACKGROUND OF THE INVENTION

Field of the Invention

The present invention relates to a power supply apparatus and an image forming apparatus, and particularly relates to switching control of a DCDC converter apparatus in a low load state.

Description of the Related Art

A half-bridge type current resonance circuit is adopted in many power supply apparatuses, due to high efficiency in rated load, low noise, and the fact that one coil (transformer) can be used compared with a forward power supply. However, it is known that a power supply apparatus including a current resonance circuit does not have good efficiency in a low load state. Therefore, conventionally, in order to improve the efficiency in a low load state, the two-converter system has been adopted that is connected to a flyback converter having a small output and stops the current resonance circuit (refer to Japanese Patent Application Laid-Open No. 2013-143877).

However, in order to reduce the size and cost of a power supply apparatus including a current resonance circuit using a half bridge, it is desired to improve the efficiency of the current resonance circuit in a low load state.

SUMMARY OF THE INVENTION

One aspect of the present invention is a power supply apparatus capable of improving the efficiency of the power supply apparatus including a current resonance circuit in a low load state.

Another aspect of the present invention is a power supply apparatus including a transformer including a primary winding and a secondary winding, a first switching element connected in series with the primary winding, a first diode connected in parallel with the first switching element, a second switching element connected in parallel with the primary winding, a second diode connected in parallel with the second switching element, a first capacitor connected in series with the primary winding, the first capacitor connected in parallel with the second switching element together with the primary winding connected in series with the first capacitor, a first control unit configured to control a switching operation of the first switching element and the second switching element, wherein in a case where a voltage output from the power supply apparatus is a first voltage, the first control unit continuously drives the first switching element and the second switching element, and in a case where the voltage output from the power supply apparatus is a second voltage smaller than the first voltage, the first control unit is capable of controlling the switching operation so as to repeat an operating period in which the first switching element and the second switching element are continuously driven, and a halt period in which the first switching element and the second switching element are stopped, a charge unit connected to the primary winding, and configured to store electric charge, and a connection unit connected in series with the charge unit, and configured to switch the charge unit between a connecting state in which one of charging and discharging is enabled, and a non-connecting state, wherein after a state of the connection unit is switched to the connecting state, during a period in which a current is flowing into either one of the first diode and the second diode, the first control unit performs transition from the halt period to the operating period by turning ON the switching element on a side of the either one of the first diode and the second diode into which the current is flowing.

A further aspect of the present invention is an image forming apparatus including an image forming unit configured to perform image formation on a recording material, and a power supply apparatus configured to supply electric power to the image forming apparatus so as to perform the image formation, the power supply apparatus including a transformer including a primary winding and a secondary winding, a first switching element connected in series with the primary winding, a first diode connected in parallel with the first switching element, a second switching element connected in parallel with the primary winding, a second diode connected in parallel with the second switching element, a first capacitor connected in series with the primary winding, the first capacitor connected in parallel with the second switching element together with the primary winding connected in series with the first capacitor, a first control unit configured to control a switching operation of the first switching element and the second switching element, wherein in a case where a voltage output from the power supply apparatus is a first voltage, the first control unit continuously drives the first switching element and the second switching element, and in a case where the voltage output from the power supply apparatus is a second voltage smaller than the first voltage, the first control unit is capable of controlling the switching operation so as to repeat an operating period in which the first switching element and the second switching element are continuously driven, and a halt period in which the first switching element and the second switching element are stopped, a charge unit connected to the primary winding, and configured to store electric charge, and a connection unit connected in series with the charge unit, and configured to switch the charge unit between a connecting state in which one of charging and discharging is enabled, and a non-connecting state, wherein after a state of the connection unit is switched to the connecting state, during a period in which a current is flowing into either one of the first diode and the second diode, the first control unit performs transition from the halt period to the operating period by turning ON the switching element on a side of the either one of the first diode and the second diode into which the current is flowing.

Further features of the present invention will become apparent from the following description of exemplary embodiments with reference to the attached drawings.

BRIEF DESCRIPTION OF THE DRAWINGS

FIGS. 2A, 2B, 2C, 2D, 2E and 2F are diagrams illustrating the waveforms of each part of the power supply apparatus of Example 1 in a rated load state.

FIG. 4 is a diagram describing the direction of a current flowing into a circuit of the power supply apparatus of Example 1 in each period.

FIG. 7 is a diagram describing the direction of a current flowing into a circuit of the power supply apparatus of Example 2 in each period.

FIGS. 8A, 8B, 8C, 8D, 8E, 8F, 8G and 8H are diagrams illustrating the waveform of each part of the power supply apparatus of Example 3 in a further lower load state.

FIG. 9 is a diagram describing the direction of a current flowing into a circuit of the power supply apparatus of Example 3 in each period.

FIGS. 10A, 10B, 10C, 10D, 10E, 10F, 10G, 10H and 10I are diagrams illustrating the waveform of each part of the power supply apparatus of Example 4 in a normal state.

FIGS. 11A, 11B, 11C, 11D, 11E, 11F, 11G, 11H and 11I are diagrams illustrating the waveform of each part of conventional control in an out-of-resonance occurrence state in comparison with Example 4.

FIGS. 12A, 12B, 12C, 12D, 12E, 12F, 12G, 12H and 12I are diagrams illustrating the waveform of each part of the control of Example 4 in an out-of-resonance occurrence state.

DESCRIPTION OF THE EMBODIMENTS

Preferred embodiments of the present invention will now be described in detail in accordance with the accompanying drawings.

[Power Supply Apparatus]

Example 1 is an example in which a first capacitor of a series resonant unit also serves as an example of a charging and discharging unit, and a third switching element is connected in series to the first capacitor. If a halt period is provided, which is a period in which a load turns into a light load, and a switching operation is stopped by a switching control circuit, even in a case where the switching operation is resumed from the halt period, soft switching is made possible. Hereinafter, the period in which the switching operation is being performed is also called the switching period. That is, the switching control unit described below controls the third switching element, so that voltage is stored in the first capacitor in the halt period. On the other hand, at the time of resuming the switching operation, the switching control unit controls the third switching element to make a current flow into the series resonant unit by utilizing the voltage stored in the first capacitor, and performs soft switching of other switching elements.

Figure 1:
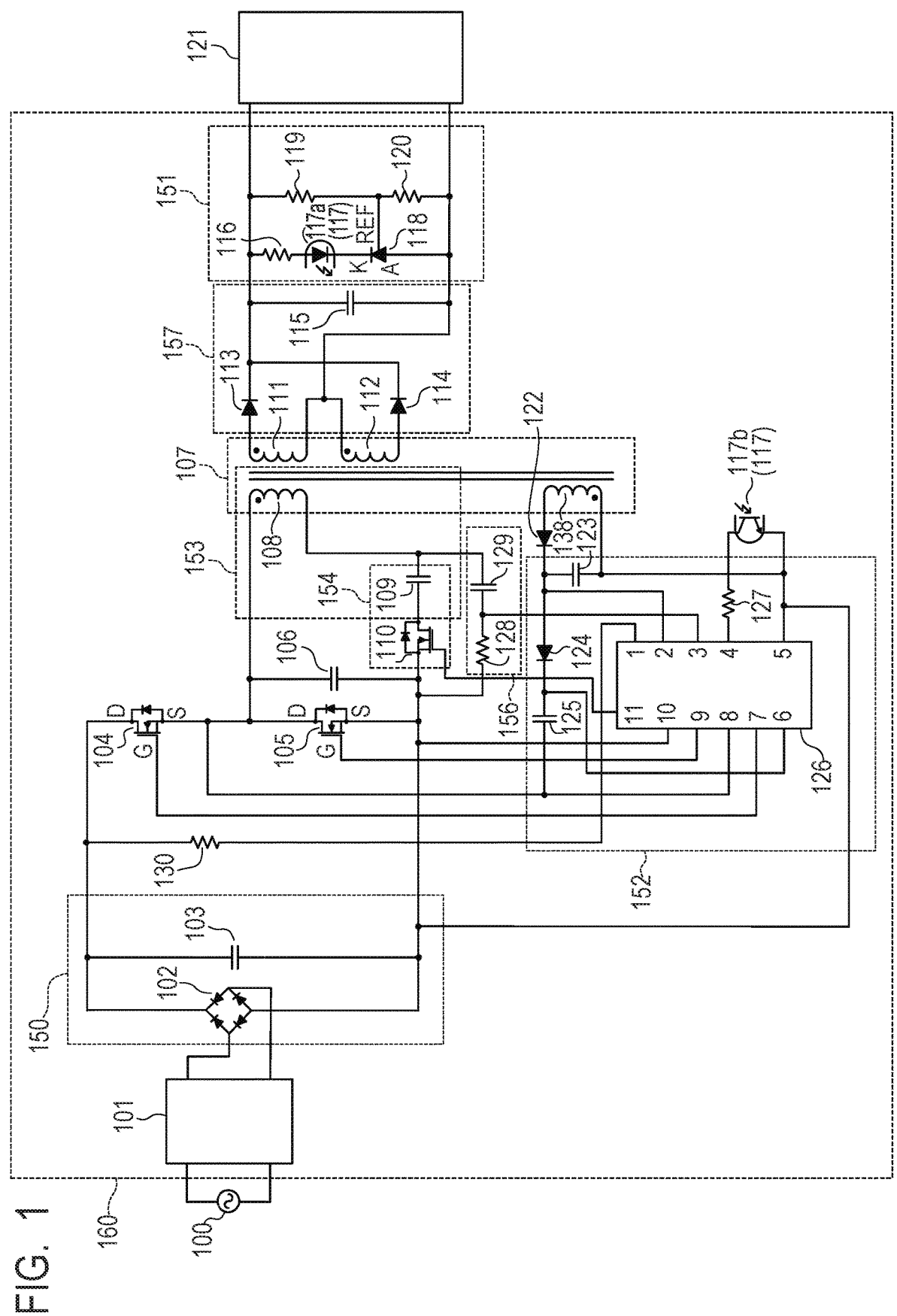
FIG. 1 is a circuit diagram of a power supply apparatus of Example 1.

FIG. 1 is a circuit diagram of a power supply apparatus 160 of Example 1. The power supply apparatus 160 is connected to a commercial AC power supply 100. The power supply apparatus 160 includes a filter part 101, which is a filter unit, and a rectifying smoothing circuit 150, which is a rectifying and smoothing unit on the primary side. The rectifying smoothing circuit 150 includes, for example, a diode bridge 102 and a capacitor 103, smoothens the voltage subjected to full wave rectification by the diode bridge 102 and the capacitor 103, and outputs the voltage to a subsequent stage. The power supply apparatus 160 includes a first switching element 104 (hereinafter referred to as the switching element 104) provided on the High side, and the switching element 104 is a field effect transistor (hereinafter referred to as a FET), for example. The power supply apparatus 160 includes a second switching element 105 (hereinafter referred to as the switching element 105) provided on the Low side, and the switching element 105 is a FET, for example. The switching elements 104 and 105 include reverse conducting diodes corresponding to a first diode and a second diode, respectively, and hereinafter these reverse conducting diodes are referred to as the body diodes. The first diode and the second diode may be diodes connected in parallel with the first switching element and the second switching element, respectively. Note that drain terminals of the switching elements 104 and 105 are illustrated as D, a source terminal is illustrated as S, and a gate terminal is illustrated as G, respectively.

The power supply apparatus 160 includes a voltage resonant capacitor 106, a series resonant circuit 153, which is a series resonant unit, and a charging and discharging circuit 154, which is a charging and discharging unit. The voltage resonant capacitor 106 is connected in parallel with the switching element 105, and performs a voltage resonant operation. The series resonant circuit 153 includes, for example, a primary winding 108 of a transformer 107, and a capacitor 109, and the primary winding 108 of the transformer 107 and the capacitor 109 constitute a series circuit connected in series. The charging and discharging circuit 154 includes, for example, the capacitor 109 and a third switching element 110 (hereinafter referred to as the switching element 110), and the capacitor 109 and the switching element 110 constitute a series circuit connected in series. Here, the capacitor 109 is used in the series resonant circuit 153 as well as in the charging and discharging circuit 154, and also functions as a charging unit. The switching element 110 functions as a connecting unit that turns into a connecting state, when discharging the electric charge stored in the capacitor 109.

The power supply apparatus 160 includes the above-described transformer 107, and the transformer 107 includes the above-described primary winding 108, secondary windings 111 and 112, and an auxiliary winding 138. The power supply apparatus 160 includes a secondary side rectifying smoothing circuit 157, which is a secondary side rectifying and smoothing unit, and a feedback circuit 151, which is a feedback unit. The secondary side rectifying smoothing circuit 157 includes diodes 113 and 114, and a secondary side smoothing capacitor 115, performs rectification on the secondary side by the diodes 113 and 114, and performs smoothing on the secondary side by the secondary side smoothing capacitor 115.

The feedback circuit 151 includes resistors 119 and 120, a shunt regulator 118, a resistor 116, and a photocoupler 117. The photocoupler 117 includes a light emitting diode (hereinafter referred to as a LED) 117a on the secondary side, and a photo-transistor 117b on the primary side. In Example 1, the voltage of the secondary side smoothing capacitor 115 is divided by the resistors 119 and 120, and the divided voltage is input to the shunt regulator 118. The shunt regulator 118 compares the input voltage with a built-in reference voltage, passes a current to the LED 117a of the photocoupler 117 via the resistor 116, and accordingly, the photo-transistor 117b of the photocoupler 117 turns into the ON state. When the photo-transistor 117b of the photocoupler 117 turns into the ON state, the information on the voltage subjected to rectification smoothing by the secondary side rectifying smoothing circuit 157 (hereinafter referred to as the output voltage) is transmitted to a switching control IC 126, which a first control unit of a switching controller 152. Hereinafter, the switching control IC 126 is abbreviated as the IC 126. The power supply apparatus 160 supplies the output voltage to a load 121.

The power supply apparatus 160 includes the above-described switching controller 152, and the switching controller 152 includes the above-described IC 126. 1 to 11 of the IC 126 are the numbers of terminals, and hereinafter, the terminals will be called the terminal 1, etc. In Example 1, the description of functions that are not directly related to the present invention, such as a soft start circuit, feedback, a current limiting function, is omitted. The terminal 1 of the IC 126 is a high-voltage input terminal to which the voltage of the primary side capacitor 103 is supplied via an AC line voltage or resistor 130, and which constitutes the power supply that activates the IC 126. In Example 1, the terminal 1 of the IC 126 is connected to the capacitor 103 via the resistor 130.

The terminal 2 of the IC 126 is a power supply terminal of the IC 126, the terminal 3 is a current detection terminal, and the terminal 4 is a feedback terminal. The voltage obtained by performing rectification smoothing by the diode 122 and the capacitor 123 on the voltage induced by the auxiliary winding 138 of the transformer 107 is input to the terminal 2, which is the power supply terminal. A signal from the LED 117a of the photocoupler 117 of the feedback circuit 151 is input to the terminal 4, which is the feedback terminal, via the photo-transistor 117b of the photocoupler 117 and the resistor 127.

The terminal 5 of the IC 126 is a GND (ground) terminal, and the terminal 6 is a bootstrap power supply terminal for operating a driver that drives the switching element 104 on the High side (hereinafter referred to as the High side driver). The terminal 6, which is the bootstrap power supply terminal, is a terminal to which a bootstrap voltage generated by the diode 124 and the capacitor 125 is input from the capacitor 123 connected to the terminal 2 (power supply terminal) of the switching controller 152. The terminal 7 is a High side gate output terminal that drives the switching element 104, the terminal 8 is a terminal connected to the intermediate potential serving as the reference of the bootstrap voltage, and the terminal 9 is a Low side gate output terminal that drives the switching element 105. Additionally, the terminals 10 is a terminal connected to a source terminal S of the switching element 105 on the low side, and the terminal 11 is a gate output terminal that drives a gate terminal of the switching element 110. The power supply apparatus 160 includes a current detection circuit 156, which is a current detection unit, and the current detection circuit 156 includes, for example, a resistor 128 and a capacitor 129. The current detection circuit 156 detects the current of the capacitor 109 by the capacitor 129 and the resistor 128.

[Direction of Current]

Here, the directions of voltage and current are defined before describing each operation. As for the drain voltages of the switching elements 104 and 105, the direction in which the voltage of a drain terminal becomes higher than the voltage of a source terminal is defined as plus. As for the drain currents of the switching elements 104 and 105, the direction in which the drain current flows from the drain terminal to the source terminal is defined as plus. As for the gate voltages of the switching elements 104 and 105, the direction in which the voltage of the gate terminal becomes higher than the voltage of the source terminal is defined as plus. Additionally, as for the current of the capacitor 109, the direction in which the current flows from one terminal connected to the primary winding 108 of the transformer 107 to the other terminal connected to the drain terminal of the switching element 110 is defined as plus, and the opposite direction is defined as minus. As for the voltage induced by the secondary windings 111 and 112 of the transformer 107, the direction in which the voltage becomes higher when connected to the anode terminals of the diodes 113 and 114 is defined as plus.

[Operation in Rated Load State]

The operation in a case where the load 121 is close to a rated load is described by using an example of each waveform of the power supply apparatus 160. Note that the rated load is the case where the voltage output from the power supply apparatus 160 is 24 V, for example. Note that, although described later, a low load state is the case where the voltage output from the power supply apparatus 160 is 5 V. FIG. 2A to FIG. 2F are graphs illustrating each waveform in the power supply apparatus 160. FIG. 2A illustrates the waveform of the gate-source voltage of the switching element 104, FIG. 2B illustrates the gate-source voltage of the switching element 105, and FIG. 2C illustrates the gate-source voltage of the switching element 110. FIG. 2D illustrates a drain current Id104 of the switching element 104, FIG. 2E illustrates a drain current Id105 of the switching element 105, and FIG. 2F illustrates a drain current Id110 of the switching element 110. Additionally, the horizontal axis represents the time in each figure. FIG. 2A to FIG. 2F are also referred to as waveform 1 to waveform 6. Note that in a case where the load 121 is close to the rated load, the switching element 110 is in an ON state (FIG. 2C).

(Period 1)

When the switching element 104 is turned ON (FIG. 2A), the current flows along the route from the capacitor 103 to the switching element 104, from the switching element 104 to the primary winding 108 of the transformer 107, from the primary winding 108 of the transformer 107 to the capacitor 109. The secondary winding 111 of the transformer 107 is wound in the same direction as the primary winding 108. When the voltage induced by the secondary winding 111 becomes higher than the forward voltage of the diode 113, the current flows from the secondary winding 111 of the transformer 107 via the diode 113 to charge the secondary side smoothing capacitor 115. In a case where the switching element 104 continues to be in the ON state, the drain current of the switching element 104 turns into a sine wave like current that flows into the series resonant circuit 153 in which the inductance of the primary winding 108 is connected in series to the capacitor 109 (FIG. 2D). The switching element 104 is turned OFF in a time period shorter than the resonant period determined by the inductance of the primary winding 108 of the transformer 107 of the series resonant circuit 153, and the capacitance of the capacitor 109. Accordingly, transition is performed from the period 1 to the period 2.

(Period 2)

Even if the switching element 104 is turned OFF, the current flowing into the primary winding 108 of the transformer 107 is maintained. Therefore, the current flows along the route from the primary winding 108 to the capacitor 109, from the capacitor 109 to the switching element 110, from the switching element 110 to the capacitor 106 by the energy stored in the transformer 107, and the capacitor 106 is charged by this current. Accordingly, the drain voltage of the switching element 105 falls.

(Period 3)

When the drain voltage of the switching element 105 falls, and becomes lower than the source voltage, the body diode of the switching element 105 is conducted. Accordingly, transition is performed from the period 2 to the period 3. While the body diode of the switching element 105 is conducted, the direction in which the drain current of the switching element 105 flows becomes minus (FIG. 2E).

(Period 4)

During the period in which the body diode of the switching element 105 is conducted, and the current flows via the body diode, the switching element 105 is turned ON. Accordingly, a zero voltage switching operation (i.e., a soft switching operation) can be performed. By turning on the switching element 105 (FIG. 2B), transition is performed from the period 3 to the period 4. After the switching element 105 is turned ON, until the energy of the primary winding 108 of the transformer 107 is exhausted, the drain current of the switching element 105 flows in the minus direction (FIG. 2E).

(Period 5)

Transition is performed from the period 4 to the period 5 when the drain current of the switching element 105 is changed from minus to plus. When the energy of the primary winding 108 is exhausted, the voltage stored in the capacitor 109 becomes maximum, and in turn, the current begins to flow by using the energy stored in the capacitor 109 as a power supply. That is, it becomes a process in which the capacitor 109 discharges.

(Period 6)

The capacitor 109 begins to discharge, and the current flows along the route from the capacitor 109 to the switching element 105 through the primary winding 108. That is, the flow of the drain current of the switching element 105 becomes plus (FIG. 2E). In this state, the voltage induced by the secondary winding 111 of the transformer 107 becomes minus, and the voltage induced by the secondary winding 111 charges the secondary side smoothing capacitor 115 via the diode 114. Thereafter, when the switching element 105 is turned OFF, the current that was flowing into the primary winding 108 is maintained by the energy stored in the primary winding 108 and by the remaining energy of the capacitor 109, and charges the capacitor 106. Transition is performed from the period 5 to the period 6 by turning OFF of the switching element 105.

(Period 7)

When the capacitor 106 is charged, and the voltage of the capacitor 106 rises to become higher than the voltage of the capacitor 103, the current begins to be supplied to the capacitor 103 via the body diode of the switching element 104. Accordingly, transition is performed from the period 6 to the period 7. By turning ON the switching element 104 during the period 7 (FIG. 2A), the soft switching operation is also performed in the switching element 104. In the state where the load 121 is the rated load, a series of operations of alternately turning ON and OFF the switching elements 104 and 105 are performed with about 50% of on-duty, for example. Here, on-duty of 50% means that the time period in which the switching elements 104 and 105 are in the ON states is about 50% in one cycle of the switching operation.

[Operation in Low Load State]

Next, the operation in the low load state in which the load 121 is lower than the rated load state is described. Note that the low load state is the case where the voltage output from the power supply apparatus 160 is 5 V. Since the efficiency is decreased when the frequency of the switching operation is excessively raised, the upper limit frequency for the switching operation (hereinafter referred to as the upper limit frequency) is set for the IC 126 in advance. The IC 126 monitors one of the frequency (hereinafter referred to as the gate drive frequency) and the ON time period of a signal output to the gate terminal of the switching element 104 or the switching element 105. Then, the IC 126 is configured such that the frequency is not raised any more when the frequency of the switching operation reaches the upper limit frequency. Accordingly, the IC 126 prevents a decrease in the efficiency in the low load state.

Here, even in the state where the IC 126 is controlling the switching operation with the upper limit frequency that is set in advance, there is a case where the voltage of the secondary side smoothing capacitor 115 rises. When the voltage of the secondary side smoothing capacitor 115 begins to rise, the LED 117a of the photocoupler 117 remains in the state of emitting light by the shunt regulator 118. Consequently, the photo-transistor 117b of the photocoupler 117 connected to the terminal 4, which is the feedback terminal of the IC 126, continues to pass the current. Therefore, the voltage of the terminal 4 of the IC 126 stops rising. When the voltage of the terminal 4 stops rising in the state where the frequency of the switching operation has reached the upper limit frequency, the IC 126 provides a halt period to be in the state of waiting for the voltage of the terminal 4 to rise, after turning ON or OFF the switching element 105. The halt period means the period in which the switching operation of the switching elements 104 and 105 is stopped, while in the continuous operation period, the switching operation of the switching elements 104 and 105 is continuously performed, as in the above-described rated load state. Since the energy is not supplied to the secondary side smoothing capacitor 115 in this state, when it is continued to supply the current by the load 121, the voltage of the secondary side smoothing capacitor 115 eventually falls.

When the voltage of the smoothing capacitor 115 falls, the shunt regulator 118 stops passing the current between the cathode (K) and the anode (A). Since the current stops flowing into the photo-transistor 117b by the LED 117a of the photocoupler 117, the voltage of the terminal 4 of the IC 126 begins to rise.

Figures 3A, 3B, 3C, 3D, 3E, 3F, 3G, 3H:
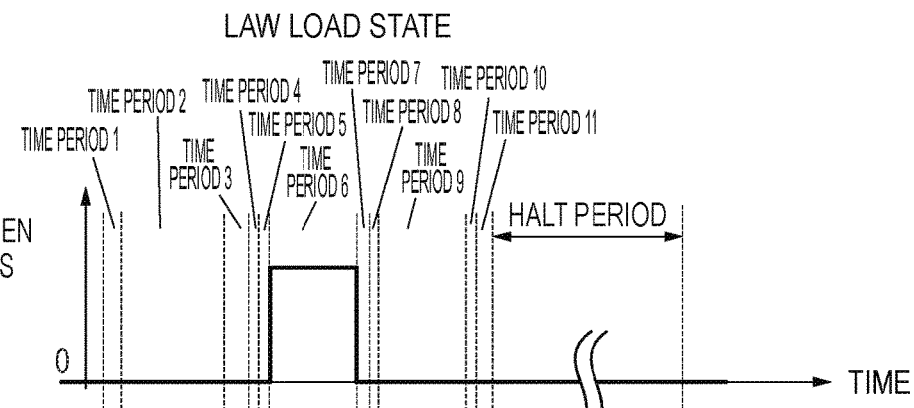
FIGS. 3A, 3B, 3C, 3D, 3E, 3F, 3G and 3H are diagrams illustrating the waveforms of each part of the power supply apparatus of Example 1 in a low load state.

The operation at the time of the halt period in the low load state is described by using the waveforms in FIG. 3A to FIG. 3H, and using FIG. 4 for the direction of current, while dividing each into the period 1 to the period 11. Note that FIG. 3A to FIG. 3F are diagrams similar to FIG. 2A to FIG. 2F. FIG. 3G illustrates the drain voltage of the switching element 105, and FIG. 3H illustrates the voltage of the terminal 4, which is the feedback terminal of the IC 126. Additionally, In FIG. 4, the important part of the power supply apparatus 160 is illustrated, and some elements, signs, leading lines, etc. are omitted for visibility. The period 1 to the period 11 correspond to the period 1 to the period 11 illustrated in FIG. 3A to FIG. 3H. The circuit diagram on top of the left column of FIG. 4 illustrates a circuit diagram of the important part of the halt period, and turning ON or OFF of each switching element.

(Period 1)

When the voltage of the terminal 4 of the IC 126 begin to rise during the halt period after the load 121 turns into the low load state, the IC 126 turns ON the switching element 110 first. Accordingly, transition is performed from the halt period to the period 1. The IC 126 continues to monitor the voltage of the terminal 4 also during the halt period, and for example, when the voltage of the terminal 4 exceeds a voltage V1 indicated by a broken line in FIG. 3H, the IC 126 performs control to resume the switching operation. Note that it is assumed that the switching element 110 has been in the OFF state, and the timing at which the switching element 110 is turned OFF will be described later. The voltage is saved at the capacitor 109 so that the voltage on the side of the drain terminal of the switching element 110 becomes high. Therefore, the current flows along the route from the primary winding 108 to the capacitor 109, while using the voltage of the capacitor 109 as a power supply, and discharging the electric charge of the capacitor 106. That is, as illustrated in the period 1 of FIG. 4, the current flows to the primary winding 108 of the transformer 107 from the capacitor 109 through the capacitor 106. The direction in which the current flows into the switching element 110 is plus (FIG. 3F). As a result, the drain voltage of the switching element 105 falls with the electric discharge of the capacitor 106 (FIG. 3G).

(Period 2)

As the drain voltage of the switching element 105 falls, the current that was flowing into the capacitor 106 flows into the body diode of the switching element 105. Accordingly, transition is performed from the period 1 to the period 2. As illustrated in the period 2 of FIG. 4, the current flows to the primary winding 108 of the transformer 107 from the capacitor 109 through the body diode of the switching element 105. The orientation of the current flowing into the switching element 105 is minus (FIG. 3E). The switching element 105 can perform the soft switching operation by turning ON the switching element 105 during the period 2 in which the current is flowing into the body diode of the switching element 105 (FIG. 3B).

(Period 3)

The primary winding 108 and the capacitor 109 continue to resonate while exchanging the energy. Therefore, the drain current of the switching element 110 (i.e., the current flowing into the capacitor 109 and the primary winding 108) flows in the minus direction while drawing a substantially sinusoidal waveform as time advances (FIG. 3F). The drain current of the switching element 105 flows in the minus direction while drawing the substantially sinusoidal waveform, and after eventually becoming 0 A, begins to flow in the plus direction. Transition from the period from 2 to the period 3 is the timing when the orientation of the drain current of the switching element 110 is changed from the plus direction to the minus direction, and the timing when the orientation of the drain current of the switching element 105 is changed from the minus direction to the plus direction. During the period 3, the drain current of the switching element 110 flows in the minus direction, and the drain current of the switching element 105 flows in the plus direction.

(Period 4)

When the switching element 105 is turned OFF after the drain current of the switching element 105 is changed to plus, the primary winding 108 of the transformer 107 attempts to save the current. Note that transition is performed from the period 3 to the period 4 at the timing when the switching element 105 is turned OFF. The current flows along the route to the capacitor 106 from the capacitor 109 through the primary winding 108 so that the capacitor 106 is charged, and the drain voltage of the switching element 105 rises (FIG. 3G). Transition is performed from the period 4 to the period 5 at the timing when the drain voltage of the switching element 105 rises to a predetermined voltage.

(Period 5)

The current in the minus direction flowing to the primary winding 108 from the capacitor 109 returns to the capacitor 103 via the body diode of the switching element 104. The switching element 104 can perform the soft switching operation by turning ON the switching element 104 while the current is flowing into the body diode of the switching element 104. Note that transition is performed from the period 5 to the period 6 at the timing when the switching element 104 is turned ON.

(Period 6)

When the energy remaining in the primary winding 108 moves to the capacitor 103, and the current of the primary winding 108 becomes 0, the current is in turn supplied from the capacitor 103. The current flows into the switching element 104 and the switching element 110 in the plus direction. That is, the current flows along the route from the capacitor 103 to the switching element 104, from the switching element 104 to the primary winding 108, from the primary winding 108 to the capacitor 109, and from the capacitor 109 to the capacitor 103. Since this current also becomes a resonance current of the primary winding 108 and the capacitor 109, when the switching element 104 and the switching element 110 are maintained in the ON states, the current is increased and decreased in a sine wave like shape. While the current of the switching element 110 is flowing in the plus direction (FIG. 3F), the switching element 104 is turned OFF (FIG. 3A). Transition is performed from the period 6 to the period 7 at the timing when the switching element 104 is turned OFF.

(Period 7)

Since the current of the primary winding 108 is saved even if the switching element 104 is turned OFF, the current flows into the capacitor 106, and the drain voltage of the switching element 105 falls (FIG. 3F). That is, the current flows along the route to the capacitor 106 from the primary winding 108 through the capacitor 109. Transition is performed from the period 7 to the period 8 at the timing when the drain voltage of the switching element 105 becomes 0.

(Period 8)

When the drain voltage of the switching element 105 becomes lower than the source voltage, the current flows into the body diode of the switching element 105. That is, the current flows along the route to the primary winding 108 from the capacitor 109 through the body diode of the switching element 105. The soft switching operation can be performed by turning ON the switching element 105 during this period 8 (FIG. 3B). Transition is performed from the period 8 to the period 9 at the timing when the switching element 105 is turned ON.

(Period 9)

When the switching element 105 is turned ON, and the current finishes flowing into the body diode of the switching element 105, the current in turn flows in the plus direction of the switching element 105. The current is flowing into the switching element 110 in the minus direction, and the switching element 105 is turned OFF during this period (FIG. 3B). Transition is performed from the period 9 to the period 10 by turning OFF of the switching element 105.

Note that the voltage of the terminal 4, which is the feedback terminal of the IC 126, falls, and in a case where it is determined that electric power is not required any more, the IC 126 turns OFF the switching element 110 as well as the switching element 105 (FIG. 3C). The IC 126 turns both of the switching elements 105 and 104 into the OFF state, and further turns the switching element 110 into the OFF state (unconnected state), so as to perform transition to the halt period. Note that, in Example 1, transition is not immediately made from the period 9 to the halt period, and transition is performed to the halt period after the periods 10 and 11 described below. In a case where the terminal 4 becomes equal to or lower than the predetermined voltage, which is the threshold value for making transition from the switching period to the halt period, the IC 126 determines that transition is to be made from the switching period to the halt period. Here, the predetermined voltage may be the above-described voltage V1, which is the threshold value for returning to the switching period from the halt period.

Additionally, in order to give a hysteresis, the predetermined voltage may be set to a voltage lower than the voltage V1 (<V1).

(Period 10)

Even if the switching element 110 is turned OFF, the current is saved by the primary winding 108 and attempts to further continue flowing, the capacitor 106 is charged, and the drain voltage of the switching element 105 rises (FIG. 3G). Note that the current flows along the route to return to the capacitor 109 from the capacitor 109 through the primary winding 108. The switching element 110 includes the body diode, which is the third diode (see FIG. 1), and the current in this period 10 flows through the body diode of the switching element 110. The capacitor 109 is charged so that the terminal on the side connected to the switching element 110 becomes plus. Transition is performed from the period 10 to the period 11 at the timing when the drain voltage of the switching element 105 rises to the predetermined voltage.

(Period 11)

The energy remaining in the primary winding 108 returns to the capacitor 103 via the body diode of the switching element 104. That is, the current flows along the route from the primary winding 108 to the body diode of the switching element 104, from the body diode of the switching element 104 to the capacitor 103, from the capacitor 103 to the body diode of the switching element 110, and from the body diode of the switching element 110 to the capacitor 109. By also turning OFF the switching element 110 when turning OFF the switching element 105, the capacitor 109 can be charged in preparation for the operation at the time of returning to the switching period from the halt period the next time. When the current stops flowing into the body diode of the switching element 104 and the body diode of the switching element 110, transition is performed from the period 11 to the halt period.

Such control in Example 1 can also be performed at a predetermined time, if the constant number of the transformer 107, the capacitance of the capacitors 109 and 106, etc. are determined. However, in order to perform control more correctly, the current of the switching element 110, or the current of the switching element 105 and the capacitor 109 may be detected by the current detection circuit 156. FIG. 1 illustrates the current detection circuit 156 that detects the current of the capacitor 109. The IC 126 detects the current flowing into the capacitor 109 based on the detected result of the current detection circuit 156 that is input via the terminal 3. However, as long as it is a unit that detects the current of the capacitor 109 (or the switching elements 105 and 110), it is not limited to this method, and for example, a general shunt resistor may be connected to detect the voltage between both ends, or detection may be made by a current transformer.

As described above, since the IC 126 controls the switching element 110 and the switching elements 104 and 105, even if there is a halt period in the low load state, the soft switching operation is enabled, and the efficiency can be improved and the occurrence of noise can also be prevented. In Example 1, the example has been described in which the transformer 107, the capacitor 109, and the switching element 110 are connected in parallel with the switching element 105 on the Low side. However, it is equivalent even if the transformer 107, the capacitor 109, and the switching element 110 are connected in parallel with the switching element 104 on the High side. In this case, the connection point between the switching element 104 and the switching element 105 and the primary winding 108 of the transformer 107 are connected to each other. The switching element 110 and the capacitor 109 are connected to the connection point side of the rectifying smoothing circuit 150 and the switching element 104. Accordingly, when the load 121 is in the low load state, it is set to be in a halt state in which the resonance current does not flow, and energy is stored in the charging and discharging circuit 154. Then, when resuming the switching operation, the soft switching operation of the switching elements 104 and 105 is enabled by using the energy stored in the charging and discharging circuit 154. Therefore, the soft switching operation is enabled also in the low load state.

As described above, according to Example 1, since the size and cost of the power supply apparatus including the current resonance circuit using a half bridge are reduced, the efficiency of the current resonance circuit in the low load state can be improved.

[Power Supply Apparatus]

Figure 5:
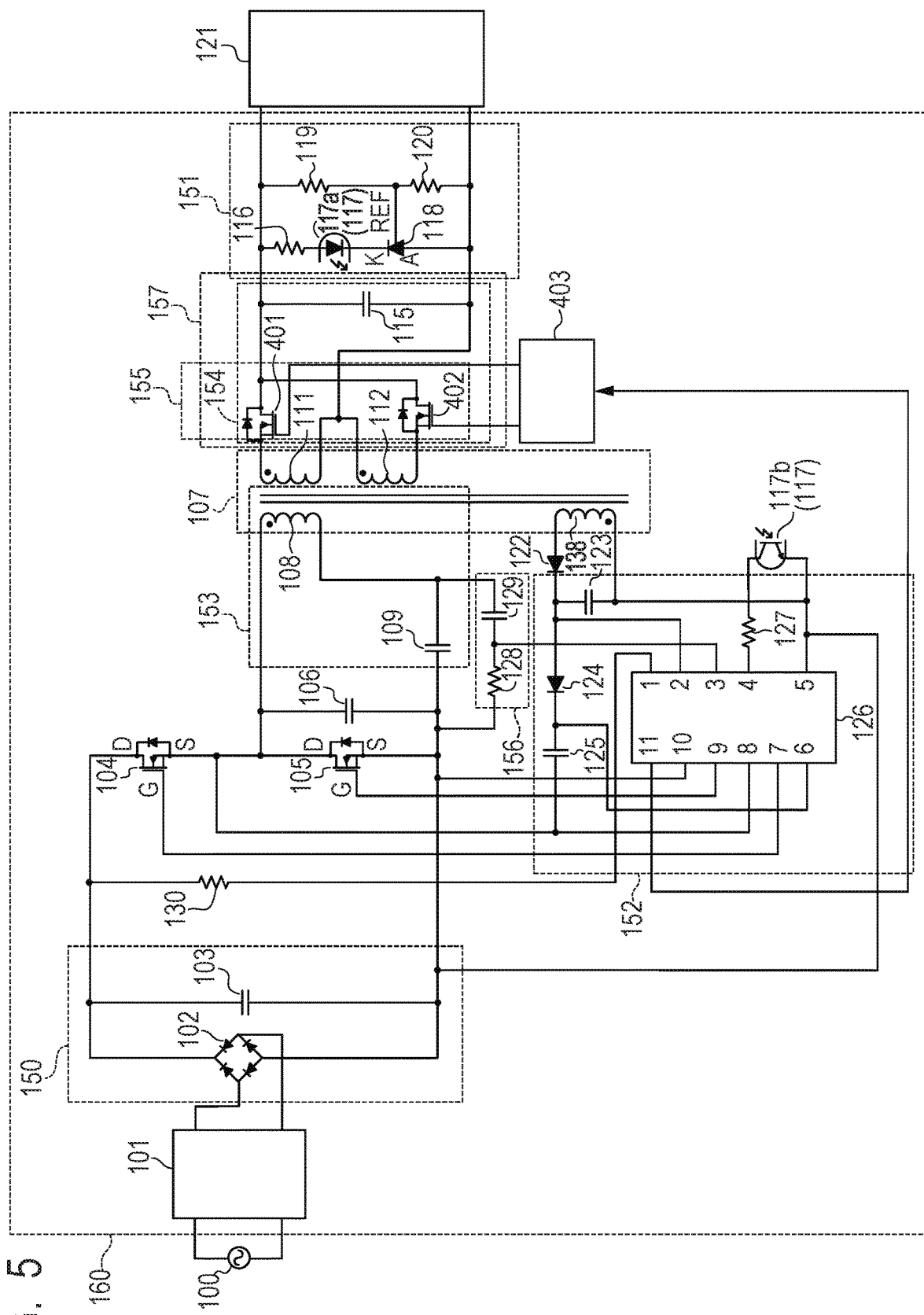
FIG. 5 is a circuit diagram of the power supply apparatus of Example 2.

Next, a power supply apparatus 160 of Example 2 is illustrated in FIG. 5. The same numerals are given to the parts that overlap with the description of Example 1, and the description of such parts will be omitted. The secondary side rectifying smoothing circuit 157 includes a fourth switching element 155. In Example 2, for example, the fourth switching element 155 is a switching element 401 and a switching element 402, and each of the switching elements 401 and 402 includes a body diode, which is the fourth diode. The charging and discharging circuit 154 includes the switching elements 401 and 402, and the secondary side smoothing capacitor 115. That is, in Example 2, the secondary side smoothing capacitor 115 is used in the secondary side rectifying smoothing circuit 157 as well as the charging and discharging circuit 154, and also functions as a charging unit. The switching elements 401 and 402 function as a connection unit that turns into a connecting state, when discharging the electric charge stored in the secondary side smoothing capacitor 115. A control circuit 403, which is a second control unit, is a secondary side switching control circuit. The terminal 11 of the IC 126 is connected to the control circuit 403, and reports the information on the voltage of the terminal 4 to the control circuit 403 via the terminal 11.

[Operation in Low Load State]

Figure 6A:
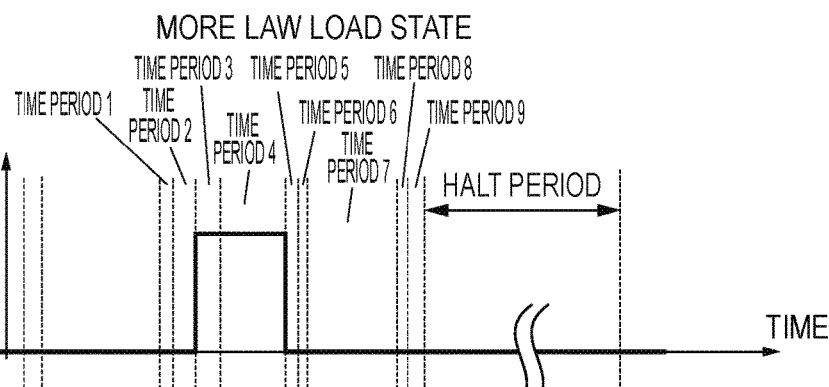
FIGS. 6A, 6B, 6C, 6D, 6E, 6F, 6G and 6H are diagrams illustrating the waveform of each part of the power supply apparatus of Example 2 in a further lower load state.
Figure 6B:
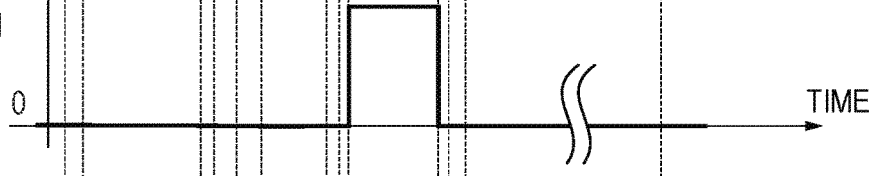
Figure 6C:
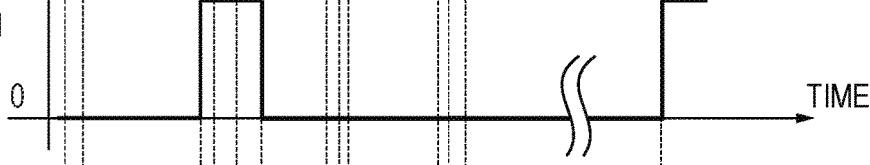
Figure 6D:
Figure 6E:
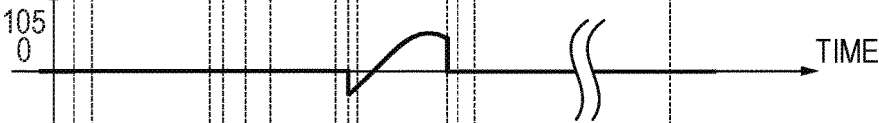
Figure 6F:
Figure 6G:
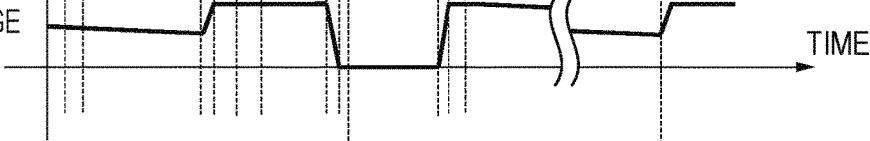
Figure 6H:
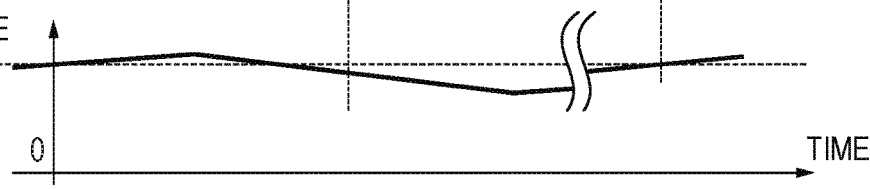

In Example 1, after the halt period, the switching element 110 on the primary side is turned on because the voltage of the terminal 4, which is the feedback terminal of the IC 126, rises, and the subsequent switching operation is performed by utilizing the electric charge of the capacitor 109. In Example 2, the switching elements 401 and 402 are arranged not on the primary side but on the secondary side, and synchronous rectification operation that utilizes a switching element instead of a diode is performed. Additionally, the switching elements 401 and 402 are driven at a timing other than the synchronous rectification operation, so as to pass the current to the secondary winding 111 of the transformer 107 from the secondary side smoothing capacitor 115. In this manner, the soft switching of the switching elements 104 and 105 on the primary side is realized. The waveform of each part is illustrated in FIG. 6A to FIG. 6H, and the direction of current of each period is illustrated in FIG. 7. Each of the period 1 to the period 9 is will be described. FIG. 6A to FIG. 6H are graphs illustrating each waveform in the power supply apparatus 160. FIG. 6A illustrates the waveform of the gate-source voltage of the switching element 104, FIG. 6B illustrates the gate-source voltage of the switching element 105, and FIG. 6C illustrates the gate-source voltage of the switching element 401. FIG. 6F illustrates a drain current Id104 of the switching element 104, FIG. 6E illustrates a drain current Id105 of the switching element 105, and FIG. 6F illustrates a drain current Id401 of the switching element 401. FIG. 6G illustrates the drain voltage of the switching element 105, and FIG. 6H illustrates the voltage of the terminal 4 of the IC 126, and also illustrates the voltage V1. FIG. 6A to FIG. 6H are also called waveform 1 to waveform 8. The horizontal axis represents the time in each figure.

(Period 1)

When the voltage of the terminal 4 rises, and exceeds the voltage V1, the IC 126 reports the information that the voltage of the terminal 4 has exceeded the voltage V1 to the control circuit 403. The control circuit 403 turns ON the switching element 401 based on the information from the IC 126. By turning ON the switching element 401, transition is performed from the halt period to the period 1. Then, the current flows into the secondary winding 111 by using the voltage of the secondary side smoothing capacitor 115 as a power supply. That is, the current flows along the route to returns to the secondary side smoothing capacitor 115 from the secondary side smoothing capacitor 115 through the secondary winding 111. The direction at the time when the current is flowing from the drain terminal to the source terminal of the switching element 401 is defined as plus. When the current flows into the secondary winding 111, the current flows along the route from the primary winding 108 to the capacitor 106 and the capacitor 109. Then, the capacitor 106 is charged, and the drain voltage of the switching element 105 rises (FIG. 6G).

(Period 2)

When the drain voltage of the switching element 105 rises, the current begins to flow into the capacitor 103 through the body diode of the switching element 104 (FIG. 6F). Accordingly, transition is performed from the period 1 to the period 2. That is, on the primary side, the current flows along the route from the primary winding 108 to the body diode of the switching element 104, from the body diode of the switching element 104 to the capacitor 103, and from the capacitor 103 to the capacitor 109.

(Period 3)

The switching element 104 is turned ON (FIG. 6A). Accordingly, transition is performed from the period 2 to the period 3. The current flows along the route from the capacitor 103 to the switching element 104, from the switching element 104 to the primary winding 108, and from the primary winding 108 to the capacitor 109. Additionally, after turning ON the switching element 104, the switching element 401 is quickly turned OFF. Accordingly, transition is performed from the period 3 to the period 4.

(Period 4)

When the switching element 401 is turned OFF, the voltage immediately appears in the secondary winding 112, and the current flows into the secondary side smoothing capacitor 115 through the body diode of the switching element 402. Additionally, the current also flows into the primary winding 108 in the direction that charges the capacitor 109. That is, on the primary side, the current flows along the route from the capacitor 103 to the switching element 104, from the switching element 104 to the primary winding 108, and from the primary winding 108 to the capacitor 109. Since the current that flows into the primary winding 108 is turned ON by the switching element 104, the current becomes further larger with time. Since this current is the resonance current of the series resonant circuit 153 in which the primary winding 108 and the capacitor 109 are connected in series, the current has a sine wave like waveform (FIG. 6D).

(Period 5)

Before the direction of the current of the capacitor 109 becomes the minus direction, the switching element 104 is turned OFF. By turning OFF the switching element 104, transition is performed from the period 4 to the period 5. Then, the current flows into the capacitor 106, and the drain voltage of the switching element 105 falls (FIG. 6G). The current flows along the route to the capacitor 106 from the primary winding 108 through the capacitor 109.

(Period 6)

When the drain voltage of the switching element 105 becomes lower than the source voltage, the current flows into the body diode of the switching element 105. At the timing when the current begins to flow into the body diode of the switching element 105, transition is performed from the period 5 to the period 6. The current flows along the route to the body diode of the switching element 105 from the primary winding 108 through the capacitor 109. During this period 6, the switching element 105 is turned ON. Accordingly, the soft switching operation of the switching element 105 is enabled. By turning ON the switching element 105, transition is performed from the period 6 to the period 7.

(Period 7)

The current that was flowing in the minus direction when the switching element 105 was turned ON begins to flow in the plus direction with the cycle of the resonant circuit, and the current has a sine wave like waveform (FIG. 6E). That is, the current flows along the route from the primary winding 108 to the capacitor 109 through the switching element 105.

(Period 8)

When the switching element 105 is turned OFF, since the current of the primary winding 108 of the transformer 107 is saved, the capacitor 106 is charged, and the drain voltage of the switching element 105 rises (FIG. 6F). By turning OFF the switching element 105, transition is performed from the period 7 to the period 8. The current flows along the route to the capacitor 109 from of the primary winding 108 through the capacitor 106. At the timing when the drain voltage of the switching element 105 becomes higher than the voltage of the capacitor 103, transition is performed from the period 8 to the period 9.

(Period 9)

When the drain voltage of the switching element 105 becomes higher than the voltage of the capacitor 103, the body diode of the switching element 104 is conducted, and the current returns to the capacitor 103. The current flows along the route from the primary winding 108 to the body diode of the switching element 104, from the body diode of the switching element 104 to the capacitor 103, and from the capacitor 103 to the capacitor 109.

During a series of operations in the period 3 to the period 9, when the output voltage on the secondary side rises before turning OFF the switching element 105, and the voltage of the terminal 4 of the IC 126 falls, the IC 126 turns into the halt period after turning OFF the switching element 105. In a case where the voltage of the terminal 4 of the IC 126 does not fall, the IC 126 performs the switching control at a predetermined timing with respect to the switching elements 104 and 105 until the voltage of the terminal 4 of the IC 126 falls. The predetermined timing means, for example, the control close to 50% of on-duty of the rated load state or the low load state described in Example 1.

In order to perform such control, when the voltage of the terminal 4 rises and reaches a predetermined value, the IC 126 sends a signal to the control circuit 403. Note that, since transmission and reception of the signal between the IC 126 and the control circuit 403 is signal transmission and reception between the primary and the secondary, the signal needs to be sent in an insulated state. In Example 2, for example, a high-speed photocoupler (not shown) is used for the transmission and reception of the signal between the IC 126 and the control circuit 403. Note that the signal may be transmitted and received by using, for example, a transformer and a capacitor as an element for transmitting and receiving the signal in the insulated state.

As described above, by using the switching elements 401 and 402 on the secondary side instead of a diode, the synchronous rectification operation is performed, and the soft switching operation of the switching elements 104 and 105 on the primary side is also enabled. Accordingly, switching loss can be reduced, and a more efficient power supply apparatus 160 can be configured.

As described above, according to Example 2, since the size and cost of the power supply apparatus including the current resonance circuit using a half bridge are reduced, the efficiency of the current resonance circuit in the low load state can be improved.

In Example 3, only the driving timing of the switching elements 401 and 402 are different, the configuration is the same as that in Example 2, a circuit diagram of FIG. 5 is employed, and the outline of operation is described. In Example 2, when returning to the switching period from the halt period, the switching operation was started from the switching element 104 on the High side. In Example 3, at the time of resuming the switching operation from the halt period, the switching element 401 is turned ON, and the current is passed through the charging and discharging circuit 154. On this occasion, the current flows into the body diode of the switching element 104 (the period 2 of FIG. 7). However, the switching element 104 is not turned ON at this timing. When the switching element 401 is turned OFF after a defined period of time since the switching element 401 is turned ON, the current flows into the charging and discharging circuit 154 with the energy at the time when the switching element 401 is turned ON. The current flows into the body diode of the switching element 105 with the current that flows into the charging and discharging circuit 154. By turning ON the switching element 105 in the period in which the current is flowing into the body diode of the switching element 105, the switching element 105 can achieve the soft switching operation. Since the switching element 105 on the Low side does not require a bootstrap power supply unlike the switching element 104 on the High side, a stable operation is enabled even if the halt period becomes long. That is, the stable operation is enabled in a case where the load is further lower than in the low load state of Example 2, and the halt period becomes long.

[Operation in Low Load State]

The circuit diagram of the power supply apparatus 160 will be described by using FIG. 5. Additionally, the waveform of each part of the power supply apparatus 160 is illustrated in FIG. 8A to FIG. 8H, the orientation of current in each period is illustrated in FIG. 9, and the operation in each of the period 1 to the period 10 will be described. Note that FIG. 8A to FIG. 8H are the same graphs as those of FIG. 6A to FIG. 6H.

(Period 1)

Since it is the same as the period 1 in Example 2, a description is omitted.

(Period 2)

Since it is the same as the period 2 in Example 2, a description is omitted. Note that in the period 2 of FIG. 7 in Example 2, the switching element 104 is depicted as "OFF to ON". However, in Example 3, as described above, the switching element 104 is not turned ON even at this timing.

(Period 3)

When the switching element 401 is turned OFF, each winding attempts to continue passing current. In Example 3, before turning ON the switching element 105, the switching element 401 is turned OFF. By turning OFF the switching element 401, transition is performed from the period 2 to the period 3. The voltage of the terminal to which the source terminal of the switching element 401 of the secondary winding 111 is connected falls to minus, and a plus voltage appears in the secondary winding 112. In Example 2, the switching element 104 was turned ON at this timing (FIG. 7, the period 2). In Example 3, the OFF state is maintained without turning ON the switching element 104. Then, since the voltage is charged to the capacitors 103, 109 and 106, and the energy of the primary winding 108 is gradually exhausted, the current is decreased.

(Period 4)

The current begins to flow into the primary winding 108 with the energy stored in the capacitors 106 and 109. Here, since the capacitance of the capacitor 106 is small, discharging of the capacitor 106 is rapidly performed, and the drain voltage of the switching element 105 falls to 0 V or less (FIG. 6G). Accordingly, transition is performed from the period 3 to the period 4. Then, the body diode of the switching element 105 is conducted. The current flows along the route to the body diode of the switching element 105 from of the primary winding 108 through the capacitor 109.

(Period 5)

The switching element 105 is turned ON at this timing. By turning ON the switching element 105, transition is performed from the period 4 to the period 5. Due to the resonance operation of the capacitor 109 and the primary winding 108, after the current of the switching element 105 is changed to 0 from the minus direction, the current flows in the plus direction and draws a sine wave like waveform (FIG. 6E).

(Period 6)

The switching element 105 is turned OFF. By turning OFF the switching element 105, transition is performed from the period 5 to the period 6. When the switching element 105 is turned OFF, the capacitor 106 is charged, and the drain voltage of the switching element 105 rises (FIG. 6G). The current flows along the route to the capacitor 109 from the primary winding 108 through the capacitor 106.

(Period 7)

When the drain voltage of the switching element 105 becomes higher than the voltage of the capacitor 103, transition is performed from the period 6 to the period 7. Accordingly, the current flows into the body diode of the switching element 104. The current flows along the route from the primary winding 108 to the body diode of the switching element 104, from the body diode of the switching element 104 to the capacitor 103, and from the capacitor 103 to the capacitor 109.

(Period 8)

The switching element 104 is turned ON at this timing. By turning ON the switching element 104, transition is performed from the period 7 to the period 8. Accordingly, the soft switching operation of the switching element 104 is enabled. The current flows along the route to the capacitor 109 from the switching element 104 through the primary winding 108.

(Period 9)

The current that flows into the switching element 104 turns into the resonance current of the capacitor 109 and the primary winding 108. The current is changed from the minus direction to 0 A, the plus direction, and a sine wave like current (FIG. 6D). Here, when the switching element 104 is turned OFF, transition is performed from the period 8 to the period 9. When the switching element 104 is turned OFF, the capacitor 106 is discharged, and the drain voltage of the switching element 105 falls (FIG. 6G). The current flows along the route to the capacitor 109 from the capacitor 106 through the primary winding 108.

(Period 10)

The drain voltage of the switching element 105 becomes 0 V or less, the body diode of the switching element 105 is conducted, and accordingly, transition is performed from the period 9 to the period 10. The current flows in the order from the primary winding 108 to the body diode of the switching element 105 through the capacitor 109.

During a series of operations in the period 5 to the period 10, when the output voltage on the secondary side rises before turning OFF the switching element 104, and the voltage of the terminal 4 of the IC 126 falls, the IC 126 turns into the halt period after turning OFF the switching element 104. Since the voltage of the terminal 4 of the IC 126 does not easily fall in a case where a load current is large, the IC 126 performs the switching control for the switching elements 104 and 105 at predetermined timings until the voltage of the terminal 4 of the IC 126 falls. The predetermined timing means the control close to 50% of on-duty of the rated load state or the low load state described in Example 1.

As described above, in Example 3, the switching elements 401 and 402 on the secondary side are used instead of a diode as in Example 2. Accordingly, the synchronous rectification operation is performed, and the switching loss of the switching elements 104 and 105 on the primary side can be reduced, and a more efficient power supply apparatus 160 can be configured.

As described above, in a case where the load 121 is in a very low state and the halt period of the switching elements 104 and 105 becomes long, the bootstrap voltage tends to be insufficient for turning ON from the switching element 104. Therefore, if turning ON can be performed from the switching element 105, the bootstrap voltage can be obtained at that timing, and thus a more stable operation can be performed.

As described above, according to Example 3, since the size and cost of the power supply apparatus including the current resonance circuit using a half bridge are reduced, the efficiency of the current resonance circuit in the low load state can be improved.

The configurations as in Examples 1 to 3 can not only improve the efficiency in the low load state, but can also be used for a protection operation against the out-of-resonance, which is peculiar to a current resonance power supply system. That is, the IC 126 provides the halt period immediately after determining that the out-of-resonance occurs, and performs the operations in Examples 1 to 3 as the switching control operations at the time of returning from the halt period. Accordingly, it can be performed while performing the soft switching with respect to the protection operation against the out-of-resonance. In Example 4, although a description will be given by taking the power supply apparatus 160 mentioned in Example 1 as an example, the configuration in Example 2 or 3 may be applied. In FIG. 1, the IC 126 detects the current that flows into the capacitor 109 by the capacitor 129 and the resistor 128. The operation will be described by illustrating the waveform in a normal state in FIG. 10A to FIG. 10I, and the waveform in the conventional control in a case where an out-of-resonance occurs in FIG. 11A to FIG. 11I.

FIG. 10A and FIG. 11A illustrate the gate-source voltage of the switching element 104, FIG. 10B and FIG. 11B illustrate the gate-source voltage of the switching element 105, and FIG. 10C and FIG. 11C illustrate a drain-source voltage Vds of the switching element 105. FIG. 10D and FIG. 11D show the drain current Id104 of the switching element 104, and FIG. 10E and FIG. 11E show the drain current Id105 of the switching element 105. FIG. 10F and FIG. 11F illustrate the voltage between both ends of the resistor 128 of the current detection circuit 156, and two broken lines on the plus side and the minus side indicate a detection threshold value (enabling state detection threshold value) for detecting the enabling states of the switching elements 104 and 105, respectively. FIG. 10G and FIG. 11G illustrate enabling periods that are detection results of the enabling state for the switching element 105 based on the detection results. FIG. 10H and FIG. 11H illustrate enabling periods that are detection results of the enabling state for the switching element 104 based on the detection results of FIG. 10F and FIG. 11F. The IC 126 detects whether or not the out-of-resonance has occurred by using the enabling periods of FIG. 10H and FIG. 11H, which are the detection results (the voltage between both ends of the resistor 128 of FIG. 10F and FIG. 11F) of the current detection circuit 156 (FIG. 10G and FIG. 11G). FIG. 10I and FIG. 11I illustrate a detection signal in a case where the out-of-resonance is detected by the detection result of the current detection circuit 156.

Note that the IC 126 sets an enabling period to the switching element 104 in a case where the IC 126 determines that the voltage between both ends of the resistor 128 of FIG. 10D and FIG. 11D is larger than the enabling state detection threshold value on the plus side. The IC 126 sets an enabling period to the switching element 105 in a case where the voltage between both ends of the resistor 128 of FIG. 10F and FIG. 11F is smaller than the enabling state detection threshold value on the minus side.

The power supply must continue the output even in a case where the voltage of the capacitor 103 becomes low since a momentary voltage variation occurs due to a lightning surge in the commercial AC power supply 100, or a disorder in a power supply system, etc. Therefore, since the voltage of the secondary side smoothing capacitor 115, which is the output voltage, falls when the voltage of the capacitor 103 becomes low, the IC 126 makes the frequency for driving the switching elements 104 and 105 low. On this occasion, when the switching elements 104 and 105 are driven by making a time period longer than ½ of the time period of the resonant period of the transformer 107 and the capacitor 109 as the ON time, the out-of-resonance occurs.

[Control of Conventional Out-of-Resonance Occurrence State]

FIG. 10A to FIG. 10I illustrate the normal operation state of the power supply apparatus 160, the switching elements 104 and 105 are controlled by the IC 126 with the duty of 50%, and the out-of-resonance has not occurred. In a case where the out-of-resonance has not occurred, the switching elements 104 and 105 are turned OFF within the enabling periods that are set respectively. The IC 126 is monitoring whether or not the turning OFF of the switching elements 104 and 105 is within an enabling period.

On the other hand, in the conventional control in FIG. 11A to FIG. 11I, the ON time (on-duty) of the switching element 104 is longer than ½ of the time period of the resonant period of the transformer 107 and the capacitor 109, for example (FIG. 11A). In the conventional out-of-resonance detection operation, the current that flows into the capacitor 109 is divided by the capacitor 129 and the resistor 128 and is detected by the IC 126, and when an enabling period ends while the switching element 104 is ON, it is detected as an out-of-resonance. For example, although the switching element 104 is in an ON state as illustrated in FIG. 11A, the enabling period has ended as illustrated in FIG. 11H. Here, as illustrated in FIG. 11I, the IC 126 detects an out-of-resonance. The IC 126 functions as a detection unit to detect an out-of-resonance. When an out-of-resonance is detected, the IC 126 turns OFF the switching element 104 that is currently ON, and shorten the ON time for the switching element 105 (inside the dotted circle of FIG. 11B). In other words, the IC 126 increases the frequency of switching operation by having detected the out-of-resonance (the frequency is UP by the out-of-resonance detection). However, since a voltage is applied to the switching element 105 even if the ON time of the switching element 105 is shortened, a large current flows at the time when the switching element 105 is turned ON (inside the dotted circle of FIG. 11E) (out-of-resonance occurrence). For this reason, generally, in the current resonance circuit, it was necessary to use an element that has a short reverse recovery time (fast Trr characteristic) and a high energy tolerance for the switching elements 104 and 105.

[Control at the Out-of-Resonance Occurrence State in Example 4]

The operation will be described by illustrating the waveforms of Example 4 in FIG. 12A to FIG. 12I. FIG. 12A to FIG. 12I are the same graphs as those in FIG. 10A to FIG. 10I and FIG. 11A to FIG. 11I. In Example 4, when the IC 126 detects an out-of-resonance in which turning OFF is performed at a timing other than an enabling period from the voltage of resistor 128, the IC 126 turns OFF the switching element 110 and the switching element 104 to be in a halt state (inside the dotted circle of FIG. 12B). Since the IC 126 performs transition into a halt period, the switching element 105 is also in an OFF state (FIG. 12B).

Thereafter, the IC 126 turns ON the switching element 110 after a predetermined time period has passed. By inserting the halt state in this manner, the same control as in the low load state is enabled. Then, the IC 126 performs the operations illustrated in the period 1 to the period 11 in Example 1, and when the voltage of the capacitor 103 returns, the IC 126 does not detect an out-of-resonance and performs the usual operations. In this manner, with a configuration to provide the halt period when an out-of-resonance is detected, stress is not given to the switching elements 104 and 105 even under the condition with which an out-of-resonance occurs. Therefore, an inexpensive device can be used without providing a special guarantee process to the switching elements 104 and 105. Additionally, since the output voltage falls just a certain degree even if the operation for the halt period in Example 4 occurs, the influence on the subsequent equipment is also minor.

In Example 4, the description has been given of the case where it is deviated from an enabling period in the period in which the switching element 104 is ON. However, even in a case where it is deviated from an enabling period in the period in which the switching element 105 is ON, by performing the control with the same point of view, hard switching accompanying an out-of-resonance can be avoided. Additionally, in Example 4, the description has been given of the example that uses the switching element 110 as in Example 1. However, the same effects can be obtained with the configuration as illustrated in FIG. 5, which has been described in Examples 2 and 3. That is, a halt period is provided in an out-of-resonance occurrence state, and the current is passed to the charging and discharging circuit 154 by driving the switching element 401 or the switching element 402 at the time of resuming the switching from the halt period. The configuration may be made such that the driving of the switching elements 104 and 105 is resumed while the current flowing into this charging and discharging circuit 154 is flowing into the body diodes of the switching elements 104 and 105.

As described above, according to Example 4, since the size and cost of the power supply apparatus including the current resonance circuit using a half bridge are reduced, the efficiency of the current resonance circuit in the low load state can be improved.

The power supply apparatus 160 described in Examples 1 to 4 is applicable as, for example, a low voltage power supply of an image forming apparatus, i.e., a power supply that supplies power to a controller (control unit) and a driving unit such as a motor. Hereinafter, the configuration of an image forming apparatus to which the power supply apparatus 160 of Examples 1 to 4 is applied will be described.

[Configuration of Image Forming Apparatus]

Figure 13:
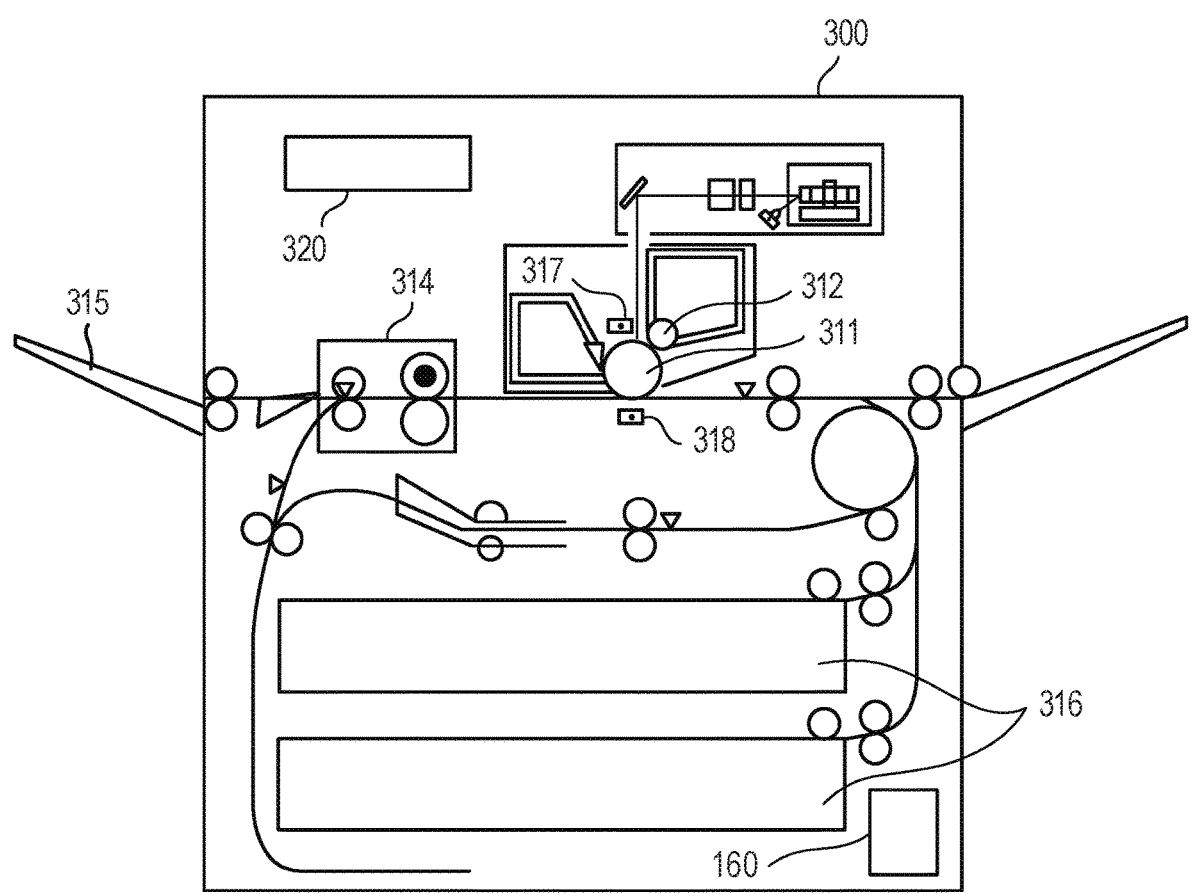
FIG. 13 is a diagram illustrating an image forming apparatus of Example 5.

As an example of the image forming apparatuses, a laser beam printer is used as an example and will be described. FIG. 13 illustrates the schematic configuration of a laser beam printer, which is an example of the electrophotography type printer. A laser beam printer 300 includes a photosensitive drum 311 as an image bearing unit on which an electrostatic latent image is formed, a charge unit 317 (charging unit) that uniformly charges the photosensitive drum 311, and a development unit 312 (developing unit) that develops the electrostatic latent image formed on the photosensitive drum 311 with a toner. Then, a toner image developed on the photosensitive drum 311 is transferred on a sheet (not shown) as a recording material, which is supplied from a cassette 316, by a transfer unit 318 (transferring unit), and the toner image transferred on the sheet is fixed by a fixing device 314, and is discharged to a tray 315. This photosensitive drum 311, the charge unit 317, the development unit 312, and the transfer unit 318 are an image forming unit. Additionally, the laser beam printer 300 includes the power supply apparatus 160 described in Examples 1 to 4. Note that the image forming apparatus to which the power supply apparatus 160 of Examples 1 to 4 is applicable is not limited to what is illustrated in FIG. 13, and may be, for example, an image forming apparatus including a plurality of image forming units. Further, it may be an image forming apparatus including a primary transfer unit that transfers the toner image on the photosensitive drum 311 to an intermediate transfer belt, and a secondary transfer unit that transfers the toner image on the intermediate transfer belt on a sheet.

The laser beam printer 300 includes a controller 320 that controls an image forming operation by the image forming unit, and a conveying operation of a sheet, and the power supply apparatus 160 described in Examples 1 to 4 supplies electric power to, for example, the controller 320. Additionally, the power supply apparatus 160 described in Examples 1 to 4 supplies electric power to a driving unit, such as a motor for driving various rollers, etc. for rotating the photosensitive drum 311 or conveying a sheet. That is, the load 121 of Examples 1 to 4 corresponds to the controller 320 and the driving unit. The image forming apparatus of Example 5 can be switched between the normal state in which the image forming operation is performed, and the standby state (for example, a power saving mode or a standby mode) in which power saving is achieved. The normal state corresponds to the rated load state, and in a case where it is in the standby state, it turns into the light load condition that reduces the load, for example, electric power is supplied only to the controller 320, which can reduce the power consumption. That is, in the image forming apparatus of Example 5, at the time of the power saving mode, the IC 126 of the power supply apparatus 160 described in Examples 1 to 4 performs the control in the low load state. Then, while the image forming apparatus is operating in the power saving mode, when returning to a switching period from a halt period, the soft switching operation of the switching elements 104 and 105 is enabled with the configuration described in Examples 1 to 4. Accordingly, the efficiency in the low load state of the current resonance circuit can be improved.

As described above, according to Example 5, since the size and cost of the power supply apparatus including the current resonance circuit using a half bridge are reduced, the efficiency of the current resonance circuit in the low load state can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-159759, filed Aug. 28, 2018, which is hereby incorporated by reference herein in its entirety.

What is claimed is:

1. A power supply apparatus comprising:
a transformer including a primary winding and a secondary winding;
a first switching element connected in series with the primary winding;
a first diode connected in parallel with the first switching element;
a second switching element connected in parallel with the primary winding;
a second diode connected in parallel with the second switching element;
a first capacitor connected in series with a resistor and the primary winding, the first capacitor with the resistor connected in parallel with a series circuit of the second switching element and the primary winding;
a first control unit configured to control a switching operation of the first switching element and the second switching element, wherein in a case where a voltage output from the power supply apparatus is a first voltage, the first control unit continuously drives the first switching element and the second switching element, and in a case where the voltage output from the power supply apparatus is a second voltage smaller than the first voltage, the first control unit is capable of controlling the switching operation so as to repeat an operating period in which the first switching element and the second switching element are continuously driven, and a halt period in which the first switching element and the second switching element are stopped;
a charge unit connected to the primary winding, and configured to store electric charge; and
a connection unit connected in series with the charge unit, and configured to switch the charge unit between a connecting state in which one of charging and discharging is enabled, and a non-connecting state,
wherein after a state of the connection unit is switched to the connecting state, during a period in which a current is flowing into either one of the first diode and the second diode, the first control unit performs transition from the halt period to the operating period by turning ON the first switching element or the second switching element on a side of the either one of the first diode and the second diode into which the current is flowing,
wherein the charge unit is a second capacitor connected in series with the second switching element,
wherein the connection unit includes a third switching element, and a third diode connected in parallel with the third switching element, and
wherein the first control unit controls the second switching element to turn on during the current flows into the second diode by discharging electric charge in the second capacitor in a turn-on state of the third switching element.

2. The power supply apparatus according to claim 1, comprising:
a primary side rectifying and smoothing unit connected to an AC power supply, the primary side rectifying and smoothing unit including a smoothing capacitor,
wherein in a case of a transition from the operating period to the halt period, the first control unit turns the first switching element and the second switching element into an OFF state, and turns the third switching element into a non-connecting state, returns an energy stored in the primary winding to the smoothing capacitor through the first diode, and flows the current into the third diode, to charge the first capacitor.

3. The power supply apparatus according to claim 1, comprising:
a feedback unit configured to feed back a signal according to a voltage induced by the secondary winding to the first control unit,
wherein the first control unit determines transition from the halt period to the operating period based on the signal fed back by the feedback unit.

4. The power supply apparatus according to claim 3, wherein the first control unit determines to stop the switching operation and to perform transition to the halt period based on the signal fed back by the feedback unit.

5. The power supply apparatus according to claim 1, comprising a detection unit configured to detect out-of-resonance,
wherein in a case where the out-of-resonance is detected by the detection unit, the first control unit stops the switching operation and performs transition to the halt period, and when returning to the switching operation from the halt period, while the current is flowing into either one of the first diode and the second diode by turning the connection unit into a connecting state to discharge electric charge stored in the charge unit, the first control unit turns ON the first switching element or the second switching element on the side of the either one of the first diode and the second diode into which the current is flowing.

6. An image forming apparatus comprising:
an image forming unit configured to perform image formation on a recording material; and a power supply apparatus configured to supply electric power to the image forming apparatus so as to perform the image formation, the power supply apparatus comprising:

a transformer including a primary winding and a secondary winding;

a first switching element connected in series with the primary winding;

a first diode connected in parallel with the first switching element;

a second switching element connected in parallel with the primary winding;

a second diode connected in parallel with the second switching element;

a first capacitor connected in series with a resistor and the primary winding, the first capacitor with the resistor connected in parallel with a series circuit of the second switching element and the primary winding;

a first control unit configured to control a switching operation of the first switching element and the second switching element, wherein in a case where a voltage output from the power supply apparatus is a first voltage, the first control unit continuously drives the first switching element and the second switching element, and in a case where the voltage output from the power supply apparatus is a second voltage smaller than the first voltage, the first control unit is capable of controlling the switching operation so as to repeat an operating period in which the first switching element and the second switching element are continuously driven, and a halt period in which the first switching element and the second switching element are stopped;

a charge unit connected to the primary winding, and configured to store electric charge; and a connection unit connected in series with the charge unit, and configured to switch the charge unit between a connecting state in which one of charging and discharging is enabled, and a non-connecting state, wherein after a state of the connection unit is switched to the connecting state, during a period in which a current is flowing into either one of the first diode and the second diode, the first control unit performs transition from the halt period to the operating period by turning ON the first switching element or the second switching element on a side of the either one of the first diode and the second diode into which the current is flowing, wherein the charge unit is a second capacitor connected in series with the second switching element, wherein the connection unit includes a third switching element, and a third diode connected in parallel with the third switching element, and wherein the first control unit controls the second switching element to turn on during the current flows into the second diode by discharging electric charge in the second capacitor in a turn-on state of the third switching element.

7. The image forming apparatus according to claim 6, comprising:

a controller configured to control the image forming unit; and a driving unit configured to drive the image forming unit, wherein electric power is supplied to one of the controller and the driving unit from the power supply apparatus.

8. The image forming apparatus according to claim 6, wherein in a case where the first voltage is output from the power supply apparatus, the image forming apparatus performs an image forming operation by the image forming unit, and in a case where the second voltage is output from the power supply apparatus, the image forming apparatus is in a power saving state.

* * * * *